United States Patent
Iida et al.

(10) Patent No.: US 10,917,591 B2
(45) Date of Patent: Feb. 9, 2021

(54) SOLID-STATE IMAGING DEVICE AND METHOD OF CONTROLLING SOLID-STATE IMAGING DEVICE, AND ELECTRONIC DEVICE

(71) Applicant: SONY SEMICONDUCTOR SOLUTIONS CORPORATION, Kanagawa (JP)

(72) Inventors: Satoko Iida, Kanagawa (JP); Masaki Sakakibara, Kanagawa (JP); Yorito Sakano, Kanagawa (JP); Naosuke Asari, Kanagawa (JP); Masaaki Takizawa, Kanagawa (JP); Tomohiko Asatsuma, Kanagawa (JP); Shogo Furuya, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/490,182

(22) PCT Filed: Mar. 30, 2018

(86) PCT No.: PCT/JP2018/013627
§ 371 (c)(1),
(2) Date: Aug. 30, 2019

(87) PCT Pub. No.: WO2018/190150
PCT Pub. Date: Oct. 18, 2018

(65) Prior Publication Data
US 2020/0029036 A1    Jan. 23, 2020

(30) Foreign Application Priority Data

Apr. 14, 2017    (JP) .................................. 2017-080316

(51) Int. Cl.
| | | |
|---|---|---|
| H04N 5/335 | (2011.01) | |
| H04N 5/355 | (2011.01) | |
| H04N 5/378 | (2011.01) | |

(52) U.S. Cl.
CPC ......... *H04N 5/35581* (2013.01); *H04N 5/378* (2013.01)

(58) Field of Classification Search
CPC .................................................. H04N 5/3535
(Continued)

(56) References Cited

U.S. PATENT DOCUMENTS

2006/0291844 A1* 12/2006 Kakkori ................... G03B 9/28
                                                                                  396/89
2014/0232929 A1    8/2014 Ichikawa et al.
(Continued)

FOREIGN PATENT DOCUMENTS

| CN | 104010128 A | 8/2014 |
| CN | 106464822 A | 2/2017 |

(Continued)

OTHER PUBLICATIONS

International Search Report and Written Opinion of PCT Application No. PCT/JP2018/013627, dated Jun. 19, 2018, 11 pages of ISRWO.

*Primary Examiner* — Anthony J Daniels
(74) *Attorney, Agent, or Firm* — Chip Law Group

(57) ABSTRACT

The present disclosure relates to a solid-state imaging device and a method of controlling a solid-state imaging device, and an electronic device for enabling appropriate expansion of a dynamic range with respect to an object moving at a high speed or an object having a large luminance difference between bright and dark to reduce motion distortion (motion artifact). Exposure of a plurality of pixels is individually
(Continued)

controlled in units of pixels. The present disclosure can be applied to a solid-state imaging device.

11 Claims, 14 Drawing Sheets

(58) Field of Classification Search
USPC .................................................. 348/294, 296
See application file for complete search history.

(56) References Cited

U.S. PATENT DOCUMENTS

| | | | |
|---|---|---|---|
| 2015/0156387 A1* | 6/2015 | Miyakoshi | ......... H04N 5/35572 348/367 |
| 2017/0078595 A1* | 3/2017 | Sugiyama | .............. H04N 5/353 |

FOREIGN PATENT DOCUMENTS

| | | |
|---|---|---|
| EP | 3145178 A1 | 3/2017 |
| JP | 2014-154982 A | 8/2014 |
| JP | 2014-160987 A | 9/2014 |
| JP | 2014-220644 A | 11/2014 |
| JP | 2015-216594 A | 12/2015 |
| JP | 2016-192707 A | 11/2016 |
| WO | 2015/174169 A1 | 11/2015 |

\* cited by examiner ical Field

SOLID-STATE IMAGING DEVICE AND METHOD OF CONTROLLING SOLID-STATE IMAGING DEVICE, AND ELECTRONIC DEVICE

CROSS REFERENCE TO RELATED APPLICATIONS

This application is a U.S. National Phase of International Patent Application No. PCT/JP2018/013627 filed on Mar. 30, 2018, which claims priority benefit of Japanese Patent Application No. JP2017-080316 filed in the Japan Patent Office on Apr. 14, 2017. Each of the above-referenced applications is hereby incorporated herein by reference in its entirety.

TECHNICAL FIELD

The present disclosure relates to a solid-state imaging device and a method of controlling a solid-state imaging device, and an electronic device, and in particular to a solid-state imaging device and a method of controlling a solid-state imaging device, and an electronic device for enabling appropriate expansion of a dynamic range with respect to an object moving at a high speed or an object having a large luminance difference between bright and dark to reduce motion distortion (motion artifact).

BACKGROUND ART

Conventionally, for example, when an exposure time is shortened in order to expand a dynamic range of an object moving at a high speed in an on-vehicle camera, there are some cases where a signal is saturated in a lighting period of a traffic signal machine, and a color of the traffic signal machine cannot be visually recognized or the signal cannot be sampled during the lighting period of the traffic signal machine, or both cannot be performed.

Therefore, as a technology for expanding the dynamic range, a method of performing imaging of a long exposure time and imaging of a short exposure time a plurality of times and generating a composite image in a subsequent circuit has been proposed (see Patent Document 1).

With such a configuration, the dynamic range can be further expanded by combining an image captured in the long exposure time and an image captured in the short exposure time.

CITATION LIST

Patent Document

Patent Document 1: Japanese Patent Application Laid-Open No. 2014-154982

SUMMARY OF THE INVENTION

Problems to be Solved by the Invention

However, in the technology described in Patent Document 1, exposure time control is performed in units of rows, and thus a row capturing an object with high illuminance without saturation and a row capturing an object with low illuminance at high sensitivity are alternately arranged. Therefore, there is a possibility that a high dynamic range cannot be obtained in an entire region.

Furthermore, since all the short exposure times are time-shared, motion artifacts are more likely to occur in the object with high illuminance, and there is a possibility that the object in an unexposed period cannot be captured.

Moreover, there is a possibility that the number of memories to be stored increases each time a short-second exposure image is generated in an accumulation period.

The present disclosure has been made in view of such a situation, and in particular enables appropriate expansion of a dynamic range with respect to an object moving at a high speed or an object having a large luminance difference between bright and dark to reduce motion distortion (motion artifact).

Solutions to Problems

A solid-state imaging device according to one aspect of the present disclosure is a solid-state imaging device including a pixel array unit including a plurality of pixels, and a pixel drive control unit configured to individually control exposure of at least a part of the plurality of pixels in units of pixels.

The pixel drive control unit can be caused to individually control an exposure start timing and an exposure end timing in the exposure of the plurality of pixels in units of pixels.

The pixel drive control unit can be caused to individually control a reset timing, a read timing, the exposure start timing, and the exposure end timing in the exposure of the plurality of pixels in units of pixels.

The pixel drive control unit can be caused to individually control the number of exposure periods of an exposure unit time in the exposure of the plurality of pixels in units of pixels.

When individually controlling the number of the exposure periods of the exposure unit time in the exposure of the plurality of pixels in units of pixels, the pixel drive control unit can be caused to control the exposure period at temporally equal intervals in the exposure unit time.

In a case where the exposure period in the exposure of the plurality of pixels is a plurality of times, an analog-to-digital converted pixel signal output from the pixel can be caused to be shift-added to an immediately preceding pixel signal every time the exposure is completed.

The pixel drive control unit can be caused to control the exposure start timing and the exposure end timing in the exposure of the plurality of pixels in a predetermined number of units of pixels.

The pixel drive control unit can be caused to include a control timing table storage unit that stores a plurality of control timing tables, each table including control information for individually controlling the exposure of the plurality of pixels in units of pixels and to individually control the exposure of the plurality of pixels in units of pixels on the basis of the control information of the control timing table.

The pixel drive control unit can be caused to switch the control timing table stored in the control timing table storage unit at predetermined time intervals.

The pixel drive control unit can be caused to switch the control timing table stored in the control timing table storage unit every predetermined number of frames.

An operation unit configured to receive an operation of a user and output an received operation signal can be further included, and the pixel drive control unit can be caused to switch the control timing table stored in the control timing table storage unit according to the operation signal from the operation unit.

A method of controlling a solid-state imaging device according to one aspect of the present disclosure is a method of controlling a solid-state imaging device, the method including individually controlling, in units of pixels, exposure of at least a part of a plurality of pixels of a pixel array unit including the plurality of pixels.

An electronic device according to one aspect of the present disclosure is an electronic device including a pixel array unit including a plurality of pixels, and a pixel drive control unit configured to individually control exposure of at least a part of the plurality of pixels in units of pixels.

According to one aspect of the present disclosure, a pixel array unit including a plurality of pixels is included, and exposure of at least a part of the plurality of pixels is individually controlled in units of pixels.

Effects of the Invention

According to one aspect of the present disclosure, a dynamic range can be appropriately expanded with respect to an object moving at a high speed or an object having a large luminance difference between bright and dark to reduce motion distortion (motion artifact).

MODE FOR CARRYING OUT THE INVENTION

Favorable embodiments of the present disclosure will be described in detail with reference to the appended drawings. Note that, in the present specification and drawings, redundant description of configuration elements having substantially the same functional configuration is omitted by providing the same sign.

Furthermore, description will be given in the following order.

1. Schematic Configuration Example of Solid-state Imaging Device
2. Detailed Configuration Example of Pixel
3. Configuration Example of Comparison Circuit
4. Configuration Example of Pixel Sharing
5. Exposure Control of Pixel-shared Pixels
6. Exposure Control Processing
7. Application Examples to Electronic Devices
8. Use Example of Solid-State Imaging Device <1. Schematic Configuration Example of Solid-state Imaging Device>

Figure 1:
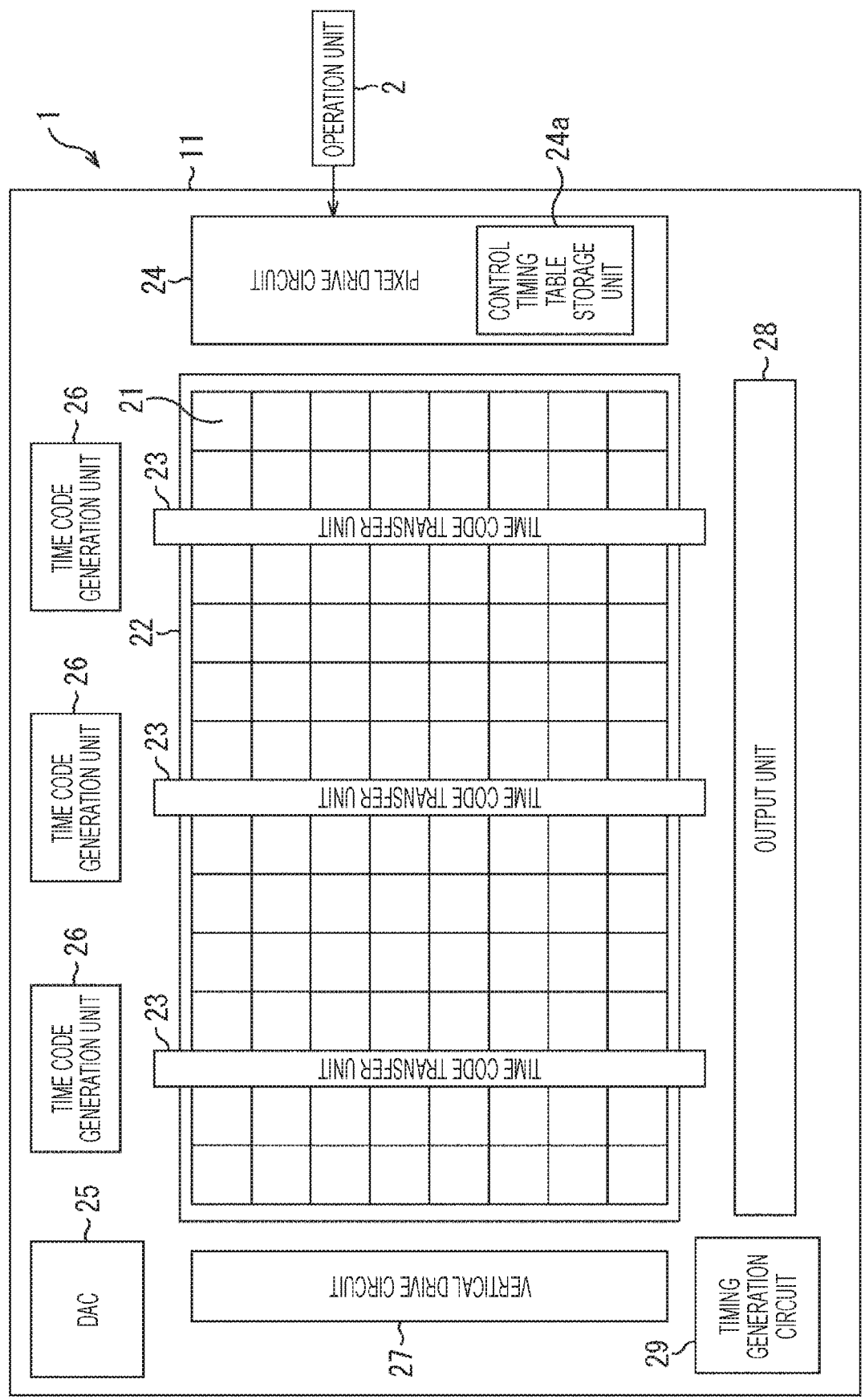
FIG. 1 is a diagram illustrating a schematic configuration of a solid-state imaging device according to the present disclosure.

FIG. 1 illustrates a schematic configuration of a solid-state imaging device according to the present disclosure.

A solid-state imaging device 1 in FIG. 1 includes a pixel array unit 22 in which pixels 21 are arranged in a two-dimensional array on a semiconductor substrate 11 using, for example, silicon (Si) as a semiconductor. The pixel array unit 22 is also provided with a time code transfer unit 23 for transferring a time code generated by a time code generation unit 26 to each pixel 21. Then, a pixel drive circuit 24, a D/A converter (DAC) 25, the time code generation unit 26, a vertical drive circuit 27, an output unit 28, and a timing generation circuit 29 are formed around the pixel array unit 22 on the semiconductor substrate 11.

Each of the pixels 21 arranged in the two-dimensional array is provided with a pixel circuit 41 and an ADC 42 as will be described below with reference to FIG. 2. The pixel 21 generates a charge signal corresponding to an amount of light received by a light-receiving element (for example, a photodiode) in the pixel, converts the charge signal into a digital pixel signal SIG, and outputs the pixel signal SIG.

The pixel drive circuit 24 drives the pixel circuit 41 (FIG. 2) in the pixel 21. More specifically, the pixel drive circuit 24 includes a control timing table storage unit 24a. The control timing table storage unit 24a stores a control timing table in which information defining control timing related to drive of each of the pixel circuits 41 of the plurality of pixels 21 is recorded, and exposure start timing, exposure end timing, reset timing, and read timing within an exposure unit time, which is a unit time for controlling exposure of the pixel circuit 41, are recorded.

By variously setting the exposure start timing, the exposure end timing, the reset timing, and the read timing in the control timing table, the length of an exposure time, an exposure period, and the number of exposures can be individually set in units of pixels 21. The pixel drive circuit 24 controls, for each pixel, the drive of the pixel circuit 41 on the basis of the information defining control timing related to drive of each of the pixel circuits 41, which is recorded in the control timing table. The pixel drive circuit 24 may switch the control timing table at predetermined intervals or may switch the control timing table to a specified control timing table according to an operation signal from an operation unit 2 that is operated by a user and outputs the operation signal according to operation content.

Moreover, the pixel drive circuit 24 may switch the control timing table to a different control timing table after a series of processing is performed on the basis of the information defining control timing related to drive of each of the pixel circuits 41 recorded in the control timing table. In this case, the control timing table may further include a control timing table to be switched next and information for specifying switching timing. With the information, the pixel drive circuit 24 can control the drive of the pixel circuit 41 while switching the control timing table.

The DAC 25 generates a reference signal (reference voltage signal) REF, which is a slope signal with a level (voltage) monotonously decreasing with a passage of time, and supplies the reference signal REF to each pixel 21. The time code generation unit 26 generates a time code used when each pixel 21 converts an analog pixel signal SIG into a digital signal (AD conversion), and supplies the time code to the corresponding time code transfer unit 23. A plurality of the time code generation units 26 is provided for the pixel array unit 22, and the time code transfer units 23 are provided in the pixel array unit 22 by the number corresponding to the time code generation units 26. In other words, the time code generation unit 26 and the time code transfer unit 23 for transferring the time code generated in the time code generation unit 26 correspond on a one-to-one basis.

The vertical drive circuit 27 performs control to output the digital pixel signal SIG generated in the pixel 21 to the output unit 28 in a predetermined order on the basis of a timing signal supplied from the timing generation circuit 29. The digital pixel signal SIG output from the pixel 21 is output from the output unit 28 to the outside of the solid-state imaging device 1. The output unit 28 performs predetermined digital signal processing such as black level correction processing for correcting a black level and correlated double sampling (CDS) processing as necessary and then outputs the digital pixel signal SIG to the outside.

The timing generation circuit 29 includes a timing generator or the like that generates various timing signals, and supplies the generated various timing signals to the pixel drive circuit 24, the DAC 25, the vertical drive circuit 27, and the like.

The solid-state imaging device 1 is configured as described above. Note that, in FIG. 1, description has been given such that all the circuits constituting the solid-state imaging device 1 are formed on one semiconductor substrate 11, but a configuration in which the circuits constituting the solid-state imaging device 1 are divided and arranged in a plurality of the semiconductor substrates 11 can be adopted.

<2. Detailed Configuration Example of Pixel>

Figure 2:
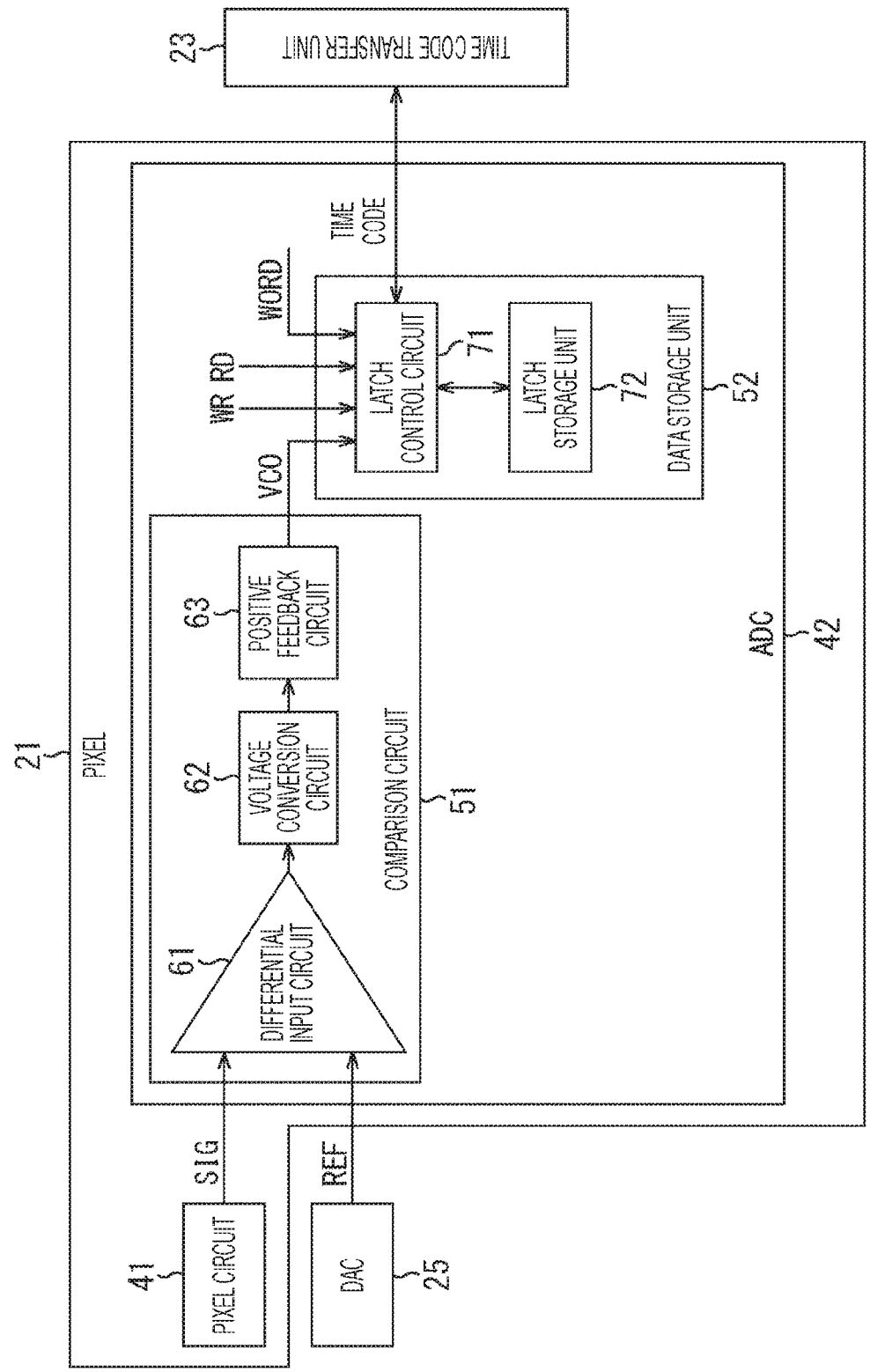
FIG. 2 is a block diagram illustrating a detailed configuration example of a pixel.

FIG. 2 is a block diagram illustrating a detailed configuration example of the pixel 21.

The pixel 21 includes a pixel circuit 41 and an AD converter (ADC) 42.

The pixel circuit 41 outputs the charge signal corresponding to the amount of received light to the ADC 42 as the analog pixel signal SIG. The ADC 42 converts the analog pixel signal SIG supplied from the pixel circuit 41 into a digital signal.

The ADC 42 includes a comparison circuit 51 and a data storage unit 52.

The comparison circuit 51 compares a reference signal REF supplied from the DAC 25 with the pixel signal SIG, and outputs an output signal VCO as a comparison result signal indicating a comparison result. The comparison circuit 51 inverts the output signal VCO when the reference signal REF and the pixel signal SIG become the same (voltage).

The comparison circuit 51 includes a differential input circuit 61, a voltage conversion circuit 62, and a positive feedback circuit (PFB) 63. Details will be described below with reference to FIG. 3.

A WR signal indicating a write operation of the pixel signal, an RD signal indicating a read operation of the pixel signal, and a WORD signal for controlling read timing of the pixel 21 during the read operation of the pixel signal are supplied from the vertical drive circuit 27 to the data storage unit 52, besides the output signal VCO is input from the comparison circuit 51 to the data storage unit 52. Furthermore, the time code generated by the time code generation unit 26 is also supplied to the data storage unit 52 via the time code transfer unit 23.

The data storage unit 52 includes a latch control circuit 71 that controls the write operation and the read operation of the time code on the basis of the WR signal and the RD signal, and a latch storage unit 72 that stores the time code.

The latch control circuit 71 causes the latch storage unit 72 to store the time code updated in every unit time supplied from the time code transfer unit 23 during a high (Hi) output signal VCO being input from the comparison circuit 51 in the write operation of the time code. Then, when the reference signal REF and the pixel signal SIG becomes the same (voltage) and the output signal VCO supplied from the comparison circuit 51 is inverted into low (Lo), the latch control circuit 71 stops the write (update) of the supplied time code and causes the latch storage unit 72 to hold the time code finally stored in the latch storage unit 72. The time code stored in the latch storage unit 72 indicates the time when the pixel signal SIG and the reference signal REF become equal, and indicates data indicating that the pixel signal SIG has been the reference voltage at that time, that is, a digitized light amount value.

After sweep of the reference signal REF is completed and the time codes are stored in the latch storage units 72 of all the pixels 21 in the pixel array unit 22, the operations of the pixels 21 are changed from the write operation to the read operation.

The latch control circuit 71 outputs the time code (digital pixel signal SIG) stored in the latch storage unit 72 to the time code transfer unit 23 when the timing becomes the pixel 21's own read timing on the basis of the WORD signal for controlling the read timing in the read operation of the time code. The time code transfer unit 23 sequentially transfers and supplies the supplied time code in a column direction (vertical direction) to the output unit 28.

Hereinafter, to distinguish the time code in the read operation from the time code written to the latch storage unit 72 in the write operation, digitized pixel data indicating that the pixel signal SIG has been the reference voltage at that time, which is an inverted time code of when the output signal VCO read from the latch storage unit 72 has been inverted in the read operation of the time code is also referred to as AD conversion pixel data.

<3. Configuration Example of Comparison Circuit>

Figure 3:
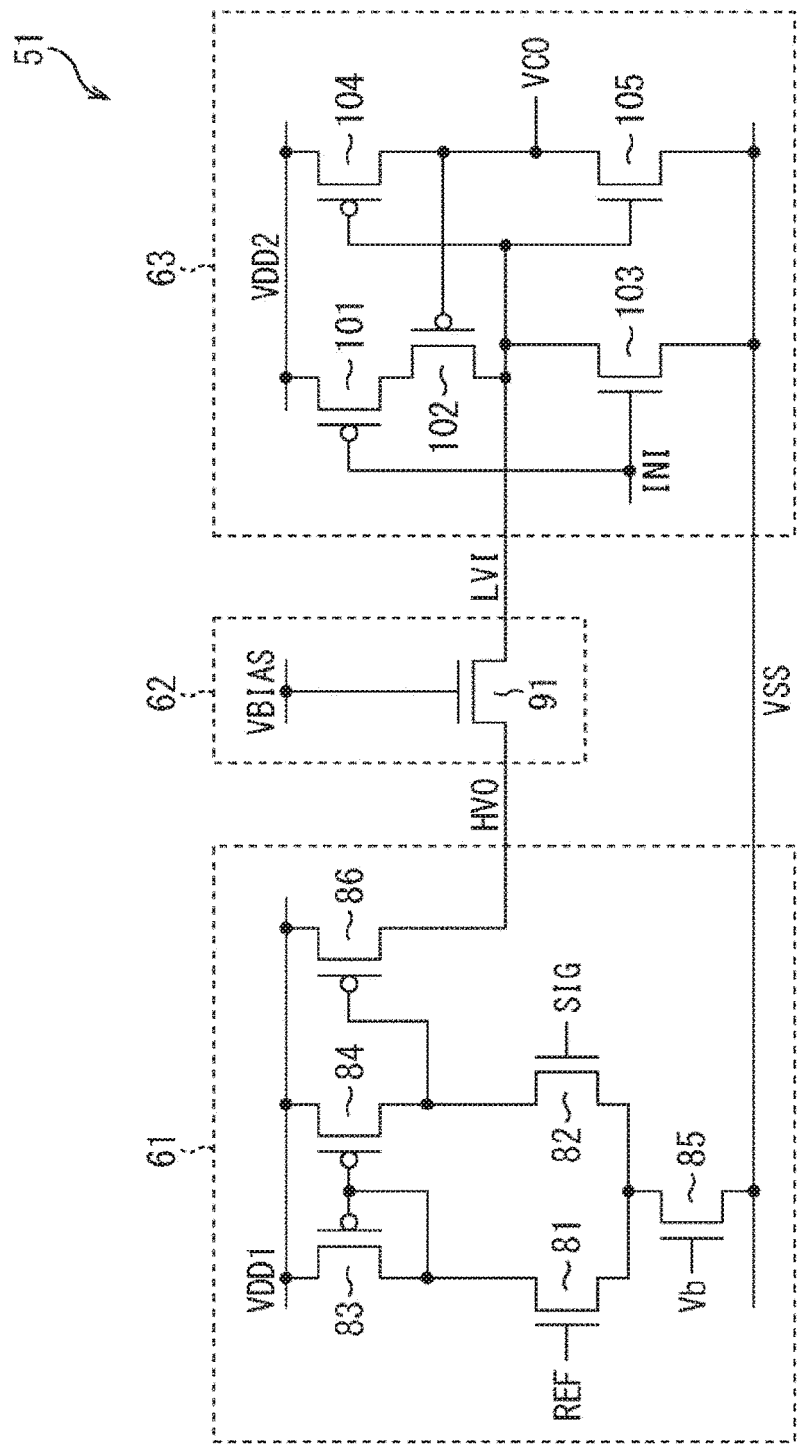
FIG. 3 is a block diagram illustrating a detailed configuration example of a comparison circuit.

FIG. 3 is a circuit diagram illustrating detailed configurations of the differential input circuit 61, the voltage conversion circuit 62, and the positive feedback circuit 63 which constitute the comparison circuit 51.

The differential input circuit 61 compares the pixel signal SIG output from the pixel circuit 41 in the pixel 21 with the reference signal REF output from the DAC 25, and outputs a predetermined signal (current) when the pixel signal SIG is higher than the reference signal REF.

The differential input circuit 61 includes transistors 81 and 82 that form a differential pair, transistors 83 and 84 constituting a current mirror, a transistor 85 as a constant current source that supplies a current IB according to an input bias current Vb, and a transistor 86 that outputs an output signal HVO of differential input circuit 61.

The transistors 81, 82, and 85 are configured by negative channel MOS (NMOS) transistors, and the transistors 83, 84, and 86 are configured by positive channel MOS (PMOS) transistors.

Between the transistors 81 and 82 forming a differential pair, the reference signal REF output from the DAC 25 is input to a gate of the transistor 81, and the pixel signal SIG output from the pixel circuit 41 in the pixel 21 is input to a gate of the transistor 82. Sources of the transistors 81 and 82 are connected to a drain of the transistor 85, and a source of the transistor 85 is connected to a predetermined voltage VSS (VSS<VDD2<VDD1).

A drain of the transistor 81 is connected to gates of the transistors 83 and 84 constituting a current mirror circuit and a drain of the transistor 83, and a drain of the transistor 82 is connected to a drain of the transistor 84 and a gate of the transistor 86. Sources of the transistors 83, 84 and 86 are connected to a first power supply voltage VDD1.

The voltage conversion circuit 62 includes, for example, an NMOS-type transistor 91. A drain of transistor 91 is connected to a drain of transistor 86 of the differential input circuit 61, a source of the transistor 91 is connected to a predetermined connection point in positive feedback circuit 63, and the gate of transistor 86 is connected to a bias voltage VBIAS.

The transistors 81 to 86 constituting the differential input circuit 61 are circuits that operate at a high voltage up to the first power supply voltage VDD1, and the positive feedback circuit 63 is a circuit that operates at a second power supply voltage VDD2 lower than the first power supply voltage VDD1. The voltage conversion circuit 62 converts the output signal HVO input from the differential input circuit 61 into a low-voltage signal (conversion signal) LVI that the positive feedback circuit 63 can operate, and supplies the signal to the positive feedback circuit 63.

It is sufficient that the bias voltage VBIAS be a voltage for converting the voltage into a voltage that does not destroy the transistors 101 to 105 of the positive feedback circuit 63 operating at a constant voltage. For example, the bias voltage VBIAS can be the same voltage (VBIAS=VDD2) as the second power supply voltage VDD2 of the positive feedback circuit 63.

The positive feedback circuit 63 outputs the comparison result signal that is inverted when the pixel signal SIG is higher than the reference signal REF on the basis of the conversion signal LVI obtained by converting the output signal HVO from the differential input circuit 61 into a signal corresponding to the second power supply voltage VDD2. Furthermore, the positive feedback circuit 63 accelerates a transition speed of when the output signal VCO output as the comparison result signal is inverted.

The positive feedback circuit 63 includes five transistors 101 to 105. Here, the transistors 101, 102, and 104 are configured by PMOS transistors, and the transistors 103 and 105 are configured by NMOS transistors.

The source of the transistor 91, which is an output terminal of the voltage conversion circuit 62, is connected to drains of the transistors 102 and 103 and gates of the transistors 104 and 105. Sources of the transistors 101 and 104 are connected to the second power supply voltage VDD2, a drain of the transistor 101 is connected to a source of the transistor 102, and a gate of the transistor 102 is connected to drains of the transistors 104 and 105, which are output terminals of the positive feedback circuit 63. Sources of the transistors 103 and 105 are connected to a predetermined voltage VSS. An initialization signal INI is supplied to gates of the transistors 101 and 103.

The transistors 104 and 105 constitute an inverter circuit, and a connection point between the drains of the transistors 104 and 105 is an output terminal for outputting the output signal VCO by the comparison circuit 51.

Figure 4:
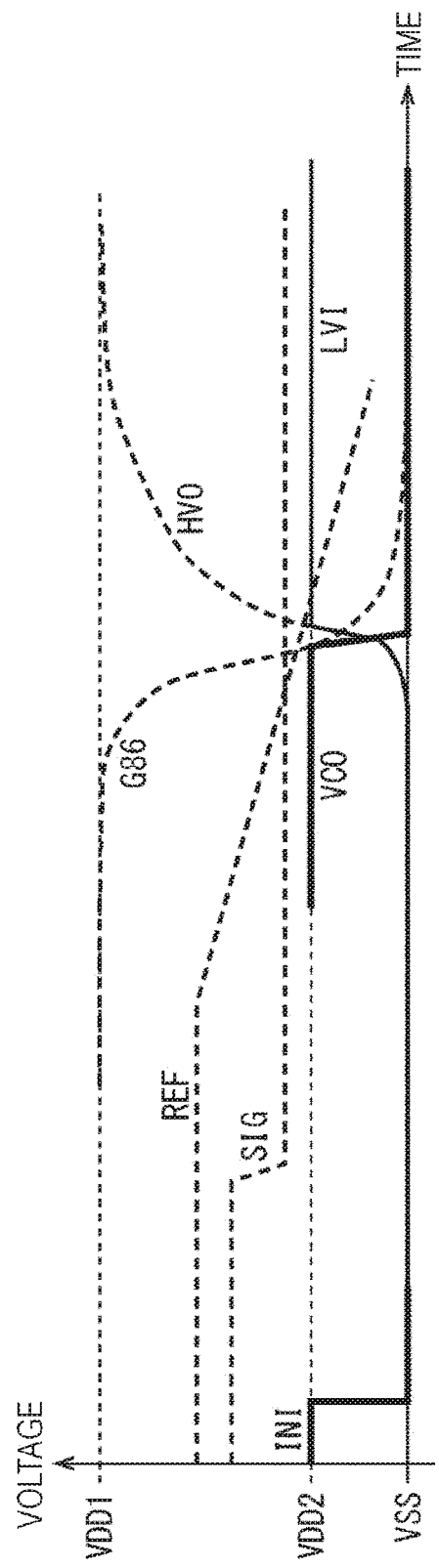
FIG. 4 is a diagram illustrating transitions of signals during operation of the comparison circuit.

An operation of the comparison circuit 51 configured as described above will be described. FIG. 4 illustrates transitions of signals during the operation of the comparison circuit 51. Note that "G86" in FIG. 4 represents a gate potential of the transistor 86.

First, the reference signal REF is set to a voltage higher than the pixel signals SIG of all the pixels 21, the initialization signal INI is set to Hi, and the comparison circuit 51 is initialized.

More specifically, the reference signal REF is applied to the gate of the transistor 81, and the pixel signal SIG is applied to the gate of the transistor 82. When the voltage of the reference signal REF is higher than the voltage of the pixel signal SIG, most of the current output from the transistor 85 serving as a current source flows to the diode-connected transistor 83 via the transistor 81. A channel resistor of the transistor 84 having a common gate to the transistor 83 becomes sufficiently low and keeps the gate of the transistor 86 at approximately a level of the first power supply voltage VDD1, and the transistor 86 is shut off. Therefore, even if the transistor 91 of the voltage conversion circuit 62 is conductive, the positive feedback circuit 63 as a charging circuit does not charge the conversion signal LVI. Meanwhile, since the Hi signal is supplied as the initialization signal INI, the transistor 103 becomes conductive, and the positive feedback circuit 63 discharges the conversion signal LVI. Furthermore, since the transistor 101 is shut off, the positive feedback circuit 63 does not charge the conversion signal LVI via the transistor 102. As a result, the conversion signal LVI is discharged to the level of the predetermined voltage VSS, the positive feedback circuit 63 outputs the Hi output signal VCO by the transistors 104 and 105 constituting the inverter, and the comparison circuit 51 is initialized.

After the initialization, the initialization signal INI is set to Lo and sweep of the reference signal REF is started.

During a period in which the reference signal REF is higher than the pixel signal SIG, the transistor 86 is turned off and is thus shut off, and the output signal VCO is turned to a Hi signal, so the transistor 102 is turned off and shut off. The transistor 103 is also shut off because the initialization signal INI is Lo. The conversion signal LVI maintains the predetermined voltage VSS in a high impedance state, and the Hi output signal VCO is output.

When the reference signal REF becomes lower than the pixel signal SIG, an output current of the transistor 85 of the current source does not flow through the transistor 81, gate potentials of the transistors 83 and 84 rise, and the channel resistor of the transistor 84 becomes high. Then a current flowing through the transistor 82 causes a voltage drop to lower the gate potential of the transistor 86, and the transistor 91 becomes conductive. The output signal HVO output from the transistor 86 is converted into the conversion signal LVI by the transistor 91 of the voltage conversion circuit 62 and is supplied to the positive feedback circuit 63. The positive feedback circuit 63 as a charging circuit charges the conversion signal LVI to cause the potential to approximate the second power supply voltage VDD2 from the low voltage VSS.

Then, when the voltage of the conversion signal LVI exceeds a threshold voltage of the inverter constituted by the transistors 104 and 105, the output signal VCO becomes Lo, and the transistor 102 becomes conductive. The transistor 101 is also conductive because the Lo initialization signal INI is applied, and the positive feedback circuit 63 rapidly charges the conversion signal LVI via the transistors 101 and 102 to raise the potential to the second power supply voltage VDD2 at once.

Since the bias voltage VBIAS is applied to the gate of the transistor 91 of the voltage conversion circuit 62, the transistor 91 is shut off when the voltage of the conversion signal LVI reaches a voltage value lower by a transistor threshold from the bias voltage VBIAS. Even if the transistor 86 remains conductive, the conversion signal LVI is not changed more than the voltage value, and the voltage conversion circuit 62 functions as a voltage clamp circuit.

The charge of the conversion signal LVI due to the conduction of the transistor 102 is originally started from the rise of the conversion signal LVI to the inverter threshold, and is a positive feedback operation to accelerate the movement. The transistor 85 that is a current source of the differential input circuit 61 has a very large number of circuits simultaneously operating in parallel in the solid-state imaging device 1 and thus the current per circuit is set to a very small current. Moreover, the reference signal REF is swept very slowly because the voltage that changes in unit time in which the time code is switched becomes an LSB step of the AD conversion. Therefore, change in the gate potential of the transistor 86 is also slow, and change in the output current of the transistor 86 driven thereby is also slow. However, by applying a positive feedback from a subsequent stage to the conversion signal LVI charged with the output current, the output signal VCO can sufficiently rapidly make transition. Desirably, a transition time of the output signal VCO is a fraction of the unit time of the time code and is typically 1 ns or less. The comparison circuit 51 of the present disclosure can achieve this output transition time by simply setting a small current of, for example, 0.1 uA to the transistor 85 of the current source.

<Detailed Configuration Example of Pixel Circuit>

The detailed configuration of the pixel circuit 41 will be described with reference to FIG. 5.

Figure 5:
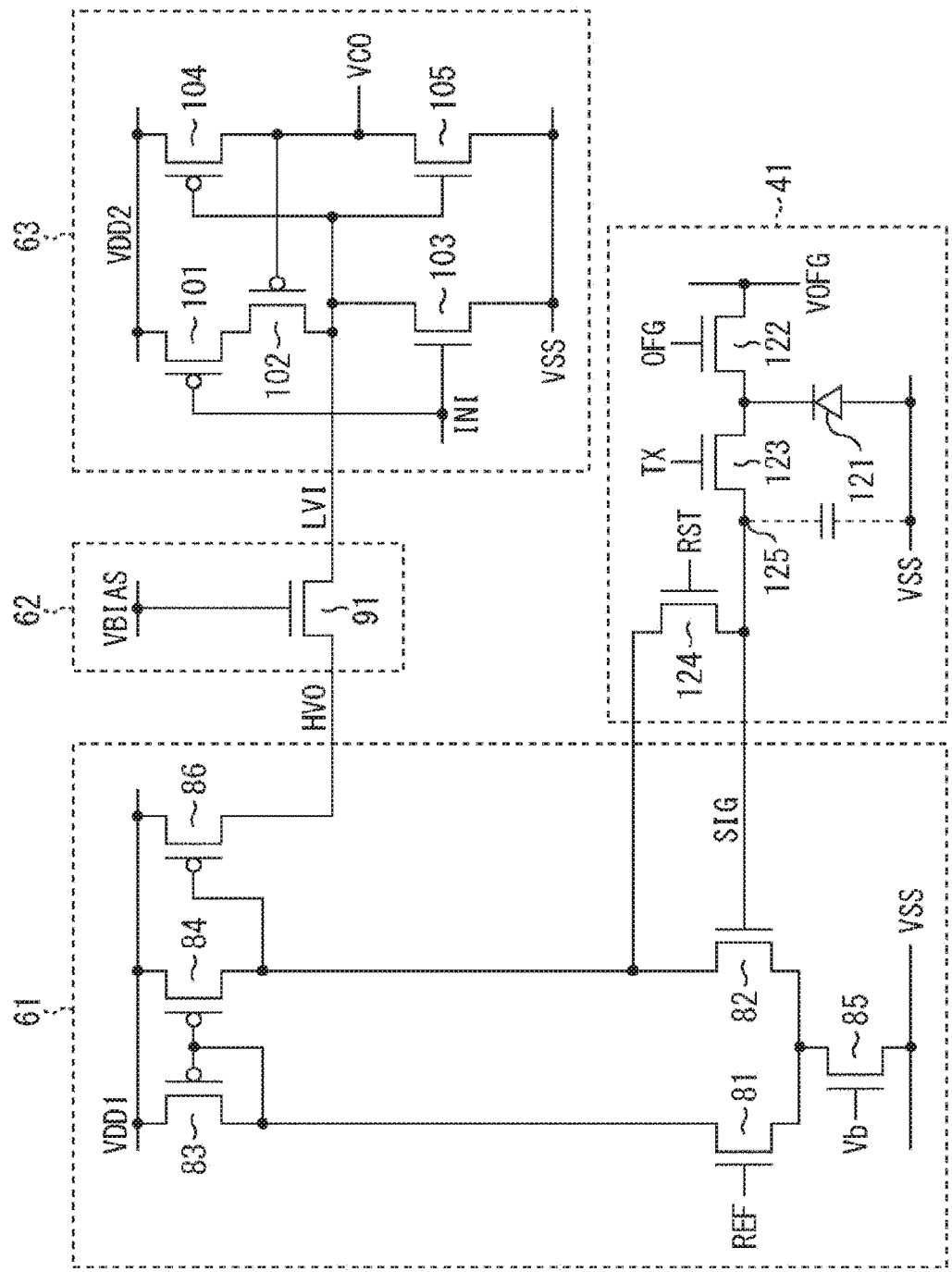
FIG. 5 is a diagram for describing a detailed configuration of a pixel circuit.

FIG. 5 is a circuit diagram illustrating the comparison circuit 51 illustrated in FIG. 3 with details of the pixel circuit 41 added.

The pixel circuit 41 includes a photodiode (PD) 121 as a photoelectric conversion element, a discharge transistor 122, a transfer transistor 123, a reset transistor 124, and a floating diffusion layer (FD) 125.

The discharge transistor 122 is used in a case of adjusting the exposure period. Specifically, when the discharge transistor 122 is turned on when desirably starting the exposure period at arbitrary timing, the charge accumulated in the photodiode 121 until then is discharged, so the exposure period is started on and after the discharge transistor 122 is turned off.

The transfer transistor 123 transfers the charge generated by the photodiode 121 to the FD 125. The reset transistor 124 resets the charge stored in the FD 125. The FD 125 is connected to the gate of the transistor 82 of the differential input circuit 61. Thus, the transistor 82 of the differential input circuit 61 also functions as an amplification transistor of the pixel circuit 41.

A source of the reset transistor 124 is connected to the gate of the transistor 82 of the differential input circuit 61 and the FD 125, and a drain of the reset transistor 124 is connected to the drain of the transistor 82. Therefore, there is no fixed reset voltage for resetting the charge of the FD 125. This is because by controlling the circuit state of the differential input circuit 61, the reset voltage for resetting the FD 125 can be arbitrarily set using the reference signal REF.

<Pixel Unit Timing Chart>

The operation of the pixel 21 illustrated in FIG. 5 will be described with reference to the timing chart in FIG. 6.

First, at time t1, the reference signal REF is set from a previous standby voltage Vstb to a reset voltage Vrst for resetting the charge of the FD 125, and the charge of the FD 125 is reset as the reset transistor 124 is turned on. Furthermore, at the time t1, the initialization signal INI supplied to the gates of the transistors 101 and 103 of the positive feedback circuit 63 is set to Hi, and the positive feedback circuit 63 is set to an initial state.

At time t2, the reference signal REF is raised to a predetermined voltage Vu, and comparison between the reference signal REF and the pixel signal SIG (sweep of the reference signal REF) is started. At this time, the output signal VCO is Hi because the reference signal REF is larger than the pixel signal SIG.

At time t3 when the reference signal REF and the pixel signal SIG are determined to be the same, the output signal VCO is inverted (transitioned to Low). When the output signal VCO is inverted, the positive feedback circuit 63 accelerates the inversion of the output signal VCO as described above. Furthermore, the data storage unit 52 stores time data (N-bit DATA [1] to DATA [N]) of the time when the output signal VCO has been inverted.

At time t4 when a signal write period ends and which is a start time of a signal read period, the voltage of the reference signal REF to be supplied to the gate of the transistor 81 of the comparison circuit 51 is lowered to a level (standby voltage Vstb) at which the transistor 81 is turned off. Thereby, current consumption of the comparison circuit 51 during the signal read period is suppressed.

At time t5, the WORD signal for controlling the read timing becomes Hi, and an N-bit latch signal Col [n] (n=1 to N) (not illustrated) is output from the latch control circuit 71 of the data storage unit 52. Data acquired here is P-phase data of a reset level of when correlated double sampling (CDS) processing is performed.

At time t6, the reference signal REF is raised to the predetermined voltage Vu, the initialization signal INI to be supplied to the gates of the transistors 101 and 103 is set to Hi, and the positive feedback circuit 63 is set to the initial state again.

At time t7, the transfer transistor 123 of the pixel circuit 41 is turned on by a Hi transfer signal TX, and the charge generated by the photodiode 121 is transferred to the FD 125.

After the initialization signal INI is returned to Low, comparison between the reference signal REF and the pixel signal SIG (sweep of the reference signal REF) is started. At this time, the output signal VCO is Hi because the reference signal REF is larger than the pixel signal SIG.

Then, at time t8 when the reference signal REF and the pixel signal SIG are determined to be the same, the output signal VCO is inverted (transitioned to Low). When the output signal VCO is inverted, the positive feedback circuit 63 accelerates the inversion of the output signal VCO. Furthermore, the data storage unit 52 stores the time data (N-bit DATA [1] to DATA [N]) of the time when the output signal VCO has been inverted.

At time t9 when a signal write period ends and which is a start time of a signal read period, the voltage of the reference signal REF to be supplied to the gate of the transistor 81 of the comparison circuit 51 is lowered to a level (standby voltage Vstb) at which the transistor 81 is turned off. Thereby, current consumption of the comparison circuit 51 during the signal read period is suppressed.

At time t10, the WORD signal for controlling the read timing becomes Hi, and the N-bit latch signal Col [n] (n=1 to N) (not illustrated) is output from the latch control circuit 71 of the data storage unit 52. Data acquired here is D-phase data of the signal level of when the CDS processing is performed. Time t11 is in the same state as the time t1 described above, and the next 1V (one vertical scanning period) is driven.

According to the above-described drive of the pixel 21, first, the P-phase data (reset level) is acquired and then read, and next, the D-phase data (signal level) is acquired and read.

By the above-described operation, the pixels 21 of the pixel array unit 22 of the solid-state imaging device 1 can perform a global shutter operation to simultaneously reset all the pixels and simultaneously expose all the pixels. Since all the pixels can be simultaneously exposed and read, a holding unit usually provided in the pixel and which holds the charge until the charge is read is not necessary. Furthermore, the configuration of the pixel 21 does not require a selection transistor or the like for selecting a pixel that outputs the pixel signal SIG, which is necessary in a column parallel read-type solid-state imaging device.

In the drive of the pixel 21 described with reference to FIG. 6, the discharge transistor 122 is controlled to be always off. However, as illustrated by the broken line in FIG. 6, after a discharge signal OFG is set to Hi and the discharge transistor 122 is once turned on and turned off at a desired time, an arbitrary exposure period can be set.

<4. Configuration Example of Pixel Sharing>

The comparison circuit 51 described above is configured such that one ADC 42 is arranged in one pixel 21. However, a plurality of pixels 21 can share one ADC 42.

Figure 7:
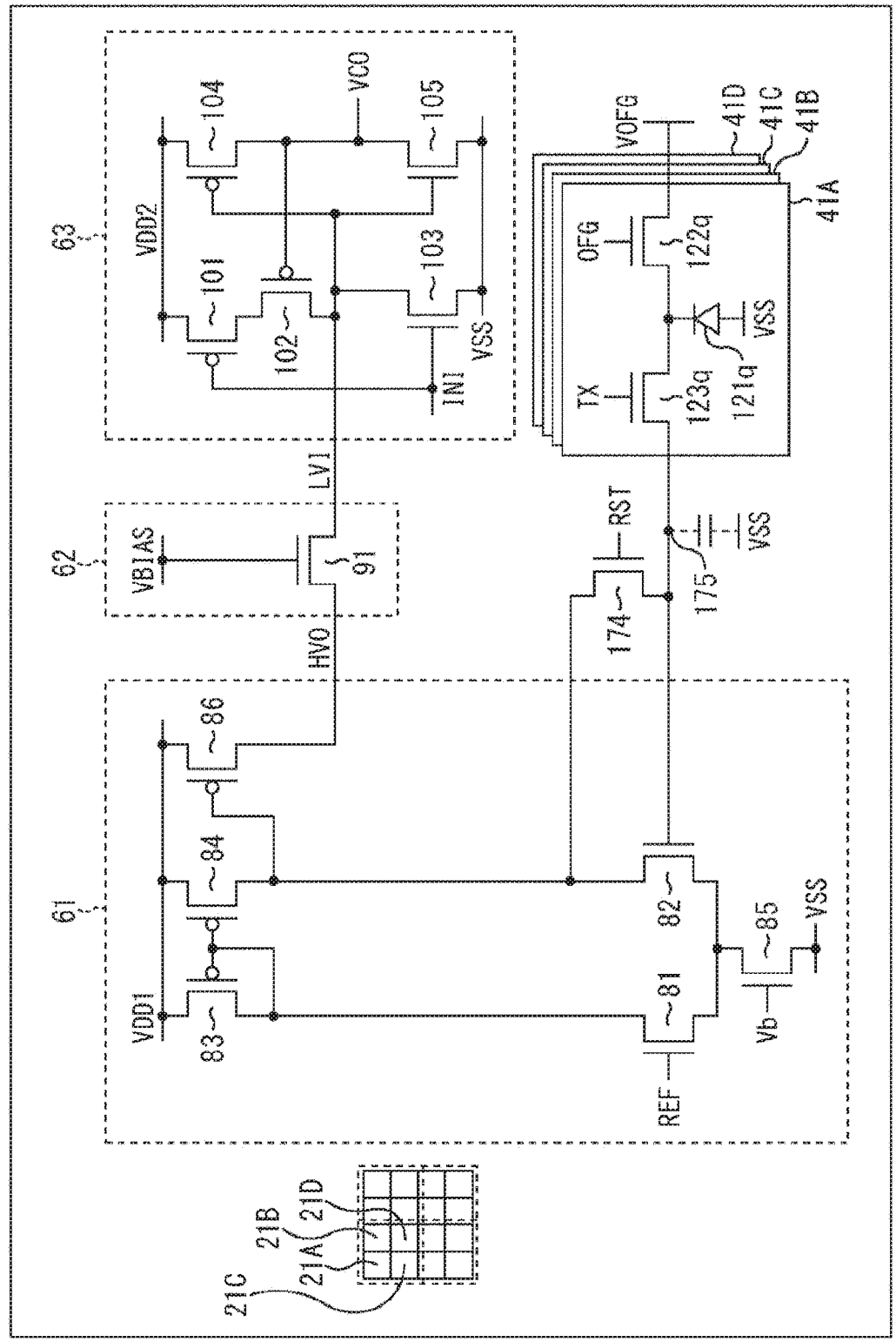
FIG. 7 is a circuit diagram illustrating a configuration example of a comparison circuit in a case of pixel sharing.

The right part in FIG. 7 illustrates a configuration example of the comparison circuit 51 in a case where one ADC 42 is shared by four pixels 21 of a pixel 21A, a pixel 21B, a pixel 21C, and a pixel 21D. The four pixels 21 of the pixel 21A, the pixel 21B, the pixel 21C, and the pixel 21D have, for example, a layout of 2 pixels×2 pixels as illustrated in the left part in FIG. 7 and are arranged in a two-dimensional array in units of 2 pixels×2 pixels sharing the ADC 42.

In the right part in FIG. 7, configurations of the differential input circuit 61, the voltage conversion circuit 62, and the positive feedback circuit 63 constituting the comparison circuit 51 are similar to the configurations illustrated in FIG. 3.

In the right part in FIG. 7, the four pixels 21A to 21D are provided with pixel circuits 41A to 41D, and each of the pixel circuits 41A to 41D is individually provided with a photodiode $121q$, a discharge transistor $122q$, and a transfer transistor $123q$. Meanwhile, reset transistor 174 and the FD 175 are shared by the four pixels 21A to 21D.

More specifically, the left part in FIG. 7 illustrates an example in which two of the four pixels of the pixel 21A, the pixel 21B, the pixel 21C, and the pixel 21D are arranged in a two-dimensional manner both in a column direction and in a row direction to configure a unit pixel group, and an example in which a plurality of the unit pixel groups is arranged in a two-dimensional manner both in the column direction and in the row direction to configure the pixel array.

The unit pixel group includes the pixels 21A to 21D inside. Then, the pixels 21A to 21D constituting the unit pixel group share one ADC 42. In other words, the unit pixel group is internally provided with one ADC 42, and the pixels 21A to 21D share the pixel ADC 42.

The right part in FIG. 7 illustrates an equivalent circuit diagram of the unit pixel group in which the four pixels 21A to 21D share one ADC 42.

In the equivalent circuit diagram illustrated in the right part in FIG. 7, the pixel 21A includes the pixel circuit 41A, and the pixel 21A includes the FD 175, the reset transistor 174, and the ADC 42 shared by the four pixels 21A to 21D that constitute the unit pixel group, and the ADC 42 includes the differential input circuit 61, the voltage conversion circuit 62, and the positive feedback circuit 63 constituting the comparison circuit 51.

Similarly, in the equivalent circuit diagram illustrated in the right part in FIG. 7, the pixel 21B includes the pixel circuit 41B, and the pixel 21B includes the FD 175, the reset transistor 174, and the ADC 42 shared by the four pixels 21A to 21D that constitute the unit pixel group, and the ADC 42 includes the differential input circuit 61, the voltage conversion circuit 62, and the positive feedback circuit 63 constituting the comparison circuit 51.

Similarly, in the equivalent circuit diagram illustrated in the right part in FIG. 7, the pixel 21C includes the pixel circuit 41C, and the pixel 21C includes the FD 175, the reset transistor 174, and the ADC 42 shared by the four pixels 21A to 21D that constitute the unit pixel group, and the ADC 42 includes the differential input circuit 61, the voltage conversion circuit 62, and the positive feedback circuit 63 constituting the comparison circuit 51.

Similarly, in the equivalent circuit diagram illustrated in the right part in FIG. 7, the pixel 21D includes the pixel circuit 41D, and the pixel 21D includes the FD 175, the reset transistor 174, and the ADC 42 shared by the four pixels 21A to 21D that constitute the unit pixel group, and the ADC 42 includes the differential input circuit 61, the voltage conversion circuit 62, and the positive feedback circuit 63 constituting the comparison circuit 51.

Note that, in the right part in FIG. 7, the circuit configuration illustrated in FIG. 3 has been adopted as the circuit configuration of the comparison circuit 51. However, another circuit configuration may be adopted.

<5. Exposure Control of Pixel-shared Pixels>

As described above, in the solid-state imaging device 1 of the present disclosure, the exposure can be controlled in units of pixels.

The pixel drive circuit 24 may control the exposure for every pixel-shared four pixels 21 according to the control timing table registered in advance in the control timing table storage unit 24a. That is, in this case, the pixel drive circuit 24 classifies the pixels 21 arranged in a two-dimensional array in the pixel array unit 22 into four types in units of 2 pixels×2 pixels, and can control the exposures of the pixels 21 by the control timing table corresponding to each of the four types of pixels 21.

Note that the number of types for classifying the pixels is not limited to four and may be another number. Furthermore, control regarding the exposure may be individually performed for all the pixels or may be individually performed for a part of the pixels.

(First Exposure Control Example)

Figure 8:
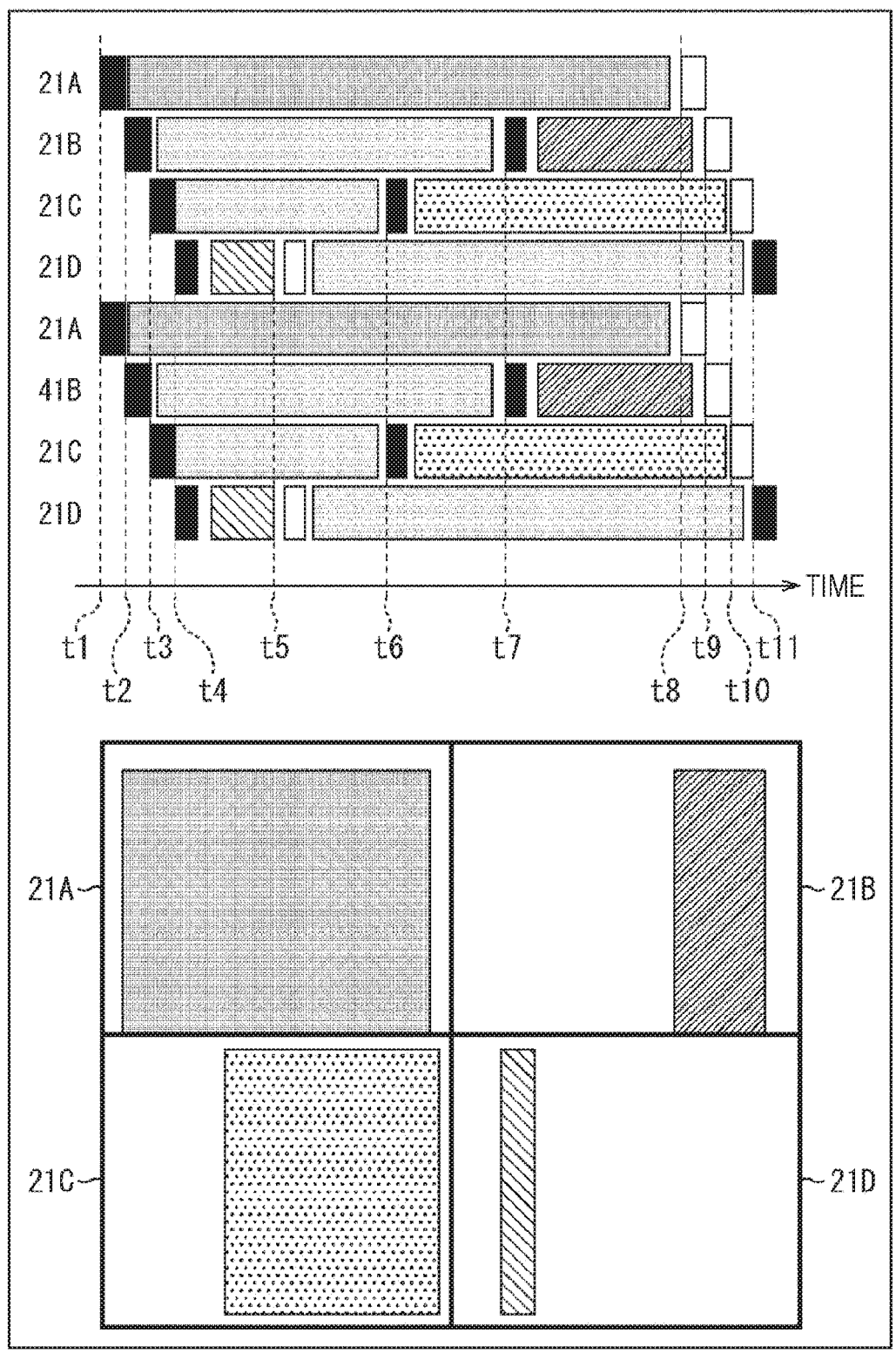
FIG. 8 is a first exposure control example of pixel-shared pixels.

For example, as illustrated in FIG. 8, the exposures of the pixels 21A to 21D can be set to individual timings.

The upper part in FIG. 8 illustrates the elapse of time in the horizontal right direction in the order of the pixels 21A to 21D and the pixels 21A to 21D from the top, and illustrates a timing chart in which timing at which reset is performed and the P-phase data is read, as represented by the black square marks, and timing at which the exposure is terminated at the white square marks and the D-phase data is read are illustrated. Hereinafter, the processing at the timing represented by the black square mark is simply referred to as reset processing, and the processing at the timing represented by the white square mark is simply referred to as reading processing.

Furthermore, a band-like mark provided with a pattern between the black square mark and the white square mark represents the exposure period. Furthermore, the marks of the exposure periods to which the same color is given represent that the exposure periods have the same length. Moreover, in the lower part in FIG. 8, the exposure period of when the length in the horizontal direction is one exposure unit time is illustrated in frames corresponding to the layout of the pixels 21A to 21D. Therefore, the exposure is repeatedly controlled with a control pattern of the exposure unit time as long as the same control timing table is continuously used.

In other words, as illustrated in the upper part of FIG. 8, in the pixel 21A, the exposure is started when the transfer transistor 123 is turned off by the transfer signal TX at timing immediately after the reset processing is performed at time t1, and the exposure is terminated when the transfer transistor 123 is turned on by the transfer signal TX and the reading processing is performed at time t8. Therefore, in the pixel 21A, a period from the timing after the reset processing at the time t1 is performed to the time t8 is the exposure period.

Furthermore, in the pixel 21B, the exposure is not performed when the transfer transistor 123 is turned on by the transfer signal TX after the reset processing is performed in time t2, the exposure is started when the transfer transistor 123 is turned off by the transfer signal TX at timing immediately after the reset processing is performed again at time t7, the exposure is terminated when the transfer transistor 123 is turned on by the transfer signal TX and the reading processing is performed at time t9. Therefore, in the pixel 21B, a period from the timing after the reset processing at the time t7 is performed to the time t9 is the exposure period.

Moreover, in the pixel 21C, the exposure is not performed when the transfer transistor 123 is turned on by the transfer signal TX after the reset processing is performed in time t3, the exposure is started when the transfer transistor 123 is turned off by the transfer signal TX at timing immediately after the reset processing is performed again at time t6, and the exposure is terminated when the transfer transistor 123 is turned on by the transfer signal TX and the reading processing is performed at time t10. Therefore, in the pixel 21C, a period from the timing after the reset processing at the time t6 is performed to the time t10 is the exposure period.

Furthermore, in the pixel 21D, the exposure is started when the transfer transistor 123 is turned off by the transfer signal TX at timing immediately after the reset processing is performed at time t4, the exposure is terminated when the transfer transistor 123 is turned on by the transfer signal TX after the reading processing is performed at time t5, and the reset processing is performed at time t11. Therefore, in the pixel 21D, a period from the timing after the reset processing at the time t4 is performed to the time t5 is the exposure period.

As illustrated in the lower part in FIG. 8, the entire period of one exposure unit time is the exposure period in the pixel 21A, a period of about ⅓ of one exposure unit time from the last is the exposure period in the pixel 21B, a period of about ⅔ of one exposure unit time from the last is the exposure period in the pixel 21C, and a period of about ⅙ of one exposure unit time from the beginning is the exposure period in the pixel 21D.

The timing and the length of the exposure period can be individually controlled in each of the pixel-shared four pixels.

Note that, in FIG. 8, the reason why the reset processing and the reading processing are not performed at the same timing is because the ADC 42 is shared by the four pixels 21 by pixel sharing, and the reset processing and the reading processing can be performed at the same timing in a case where the ADC 42 is not shared and the ADCs 42 are provided in the individual pixels.

Furthermore, information indicating timings to control on and off of the transfer transistor 123 by the transfer signal TX, including the timing when the reset processing is performed, the timing when the reading processing is performed, the exposure start timing, and the exposure end timing, as illustrated in FIG. 8, is stored in the control timing table storage unit 24a for each pixel 21, and the pixel drive circuit 24 realizes the exposure control in units of pixels 21 by controlling the operation of the pixel circuit 41 of each pixel 21 on the basis of the information of the control timing table.

(Second Exposure Control Example)

In the above description, an example in which the pixels 21A to 21D are exposed one time in one exposure unit time, and the timings and lengths of the exposure periods are controlled to become individually different has been described. However, the number of exposures may be a plurality of times and respective lengths may be made the same.

Figure 9:
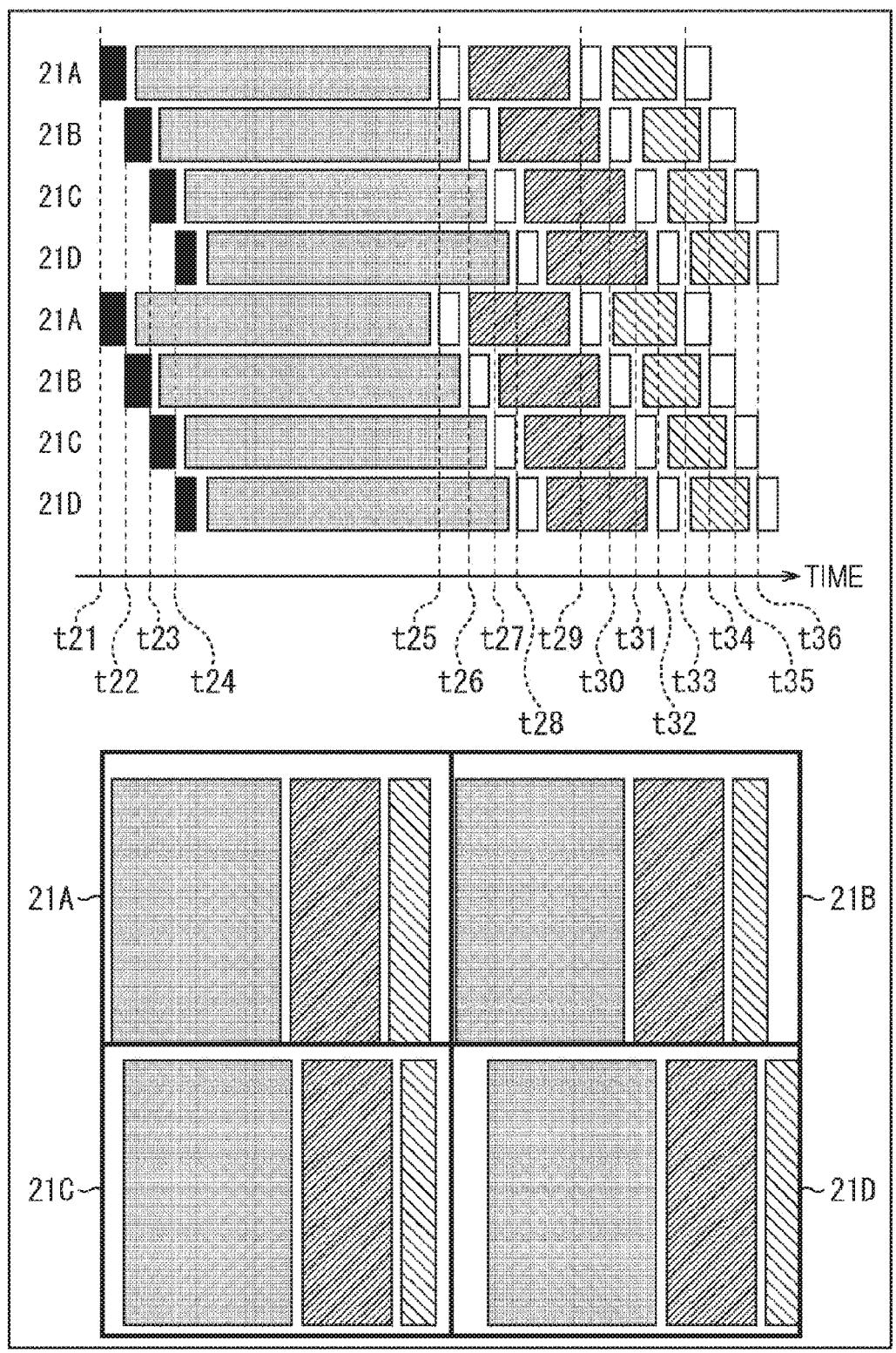
FIG. 9 is a first exposure control example of pixel-shared pixels.

In other words, as illustrated in the upper part of FIG. 9, in the pixel 21A, the exposure is started when the transfer transistor 123 is turned off by the transfer signal TX after the reset processing is performed at time t21, and the exposure is terminated when the transfer transistor 123 is turned on by the transfer signal TX and first reading processing is performed at time t25.

Thereafter, the exposure is started as the transfer transistor 123 is turned off by the transfer signal TX, and the exposure is terminated as the transfer transistor 123 is turned on by the transfer signal TX and second reading processing is performed at time t29.

Moreover, thereafter, the exposure is started as the transfer transistor 123 is turned off by the transfer signal TX, and the exposure is terminated as the transfer transistor 123 is turned on by the transfer signal TX and third reading processing is performed at time t33.

Furthermore, as illustrated in the upper part of FIG. 9, in the pixel 21B, the exposure is started when the transfer transistor 123 is turned off by the transfer signal TX after the reset processing is performed at time t22, and the exposure is terminated when the transfer transistor 123 is turned on by the transfer signal TX and the first reading processing is performed at time t26.

Thereafter, the exposure is started as the transfer transistor 123 is turned off by the transfer signal TX, and the exposure is terminated as the transfer transistor 123 is turned on by the transfer signal TX and the second reading processing is performed at time t30. Moreover, thereafter, at time t34, the third reading processing is performed.

Moreover, as illustrated in the upper part of FIG. 9, in the pixel 21C, the exposure is started when the transfer transistor 123 is turned off by the transfer signal TX after the reset processing is performed at time t23, and the exposure is terminated when the transfer transistor 123 is turned on by the transfer signal TX and the first reading processing is performed at time t27.

Thereafter, the exposure is started as the transfer transistor 123 is turned off by the transfer signal TX, and the exposure is terminated as the transfer transistor 123 is turned on by the transfer signal TX and the second reading processing is performed at time t31.

Moreover, thereafter, the exposure is started as the transfer transistor 123 is turned off by the transfer signal TX, and the exposure is terminated as the transfer transistor 123 is turned on by the transfer signal TX and the third reading processing is performed at time t35.

Furthermore, as illustrated in the upper part of FIG. 9, in the pixel 21D, the exposure is started when the transfer transistor 123 is turned off by the transfer signal TX after the reset processing is performed at time t24, and the exposure is terminated when the transfer transistor 123 is turned on by the transfer signal TX and first reading processing is performed at time t28.

Thereafter, the exposure is started as the transfer transistor 123 is turned off by the transfer signal TX, and the exposure is terminated as the transfer transistor 123 is turned on by the transfer signal TX and the second reading processing is performed at time t32.

Moreover, thereafter, the exposure is started as the transfer transistor 123 is turned off by the transfer signal TX, and the exposure is terminated as the transfer transistor 123 is turned on by the transfer signal TX and the third reading processing is performed at time t36.

Note that, as illustrated in FIG. 9, an exposure period from when the reset processing is performed and the exposure is started as the transfer transistor 123 is turned off by the transfer signal TX to when the exposure is terminated as the transfer transistor 123 is turned on by the transfer signal TX and the first reading processing is performed is referred to as first exposure period.

Furthermore, an exposure period from when the exposure is started as the transfer transistor 123 is turned off by the transfer signal TX after the first reading processing is performed to when the exposure is terminated as the transfer transistor 123 is turned on by the transfer signal TX and the second reading processing is performed is referred to as second exposure period.

Moreover, an exposure period from when the exposure is started as the transfer transistor 123 is turned off by the transfer signal TX after the second reading processing is performed to when the exposure is terminated as the transfer transistor 123 is turned on by the transfer signal TX and the third reading processing is performed is referred to as third exposure period.

Here, the first exposure period to the third exposure period are the same in any of the pixels 21A to 21D.

By the above control, exposure control of setting the number of exposures of the pixels 21A to 21D to the plurality of times and making the respective lengths of the pixels 21 the same can be realized.

(Third Exposure Control Example)

In the above description, an example in which the numbers of exposures of the exposure periods of the pixels 21A to 21D are set to a plurality of times and the timings and lengths are made the same has been described. However, the numbers of exposures may be set to a plurality of times, and the number of exposures may be made different for each pixel.

Figure 10:
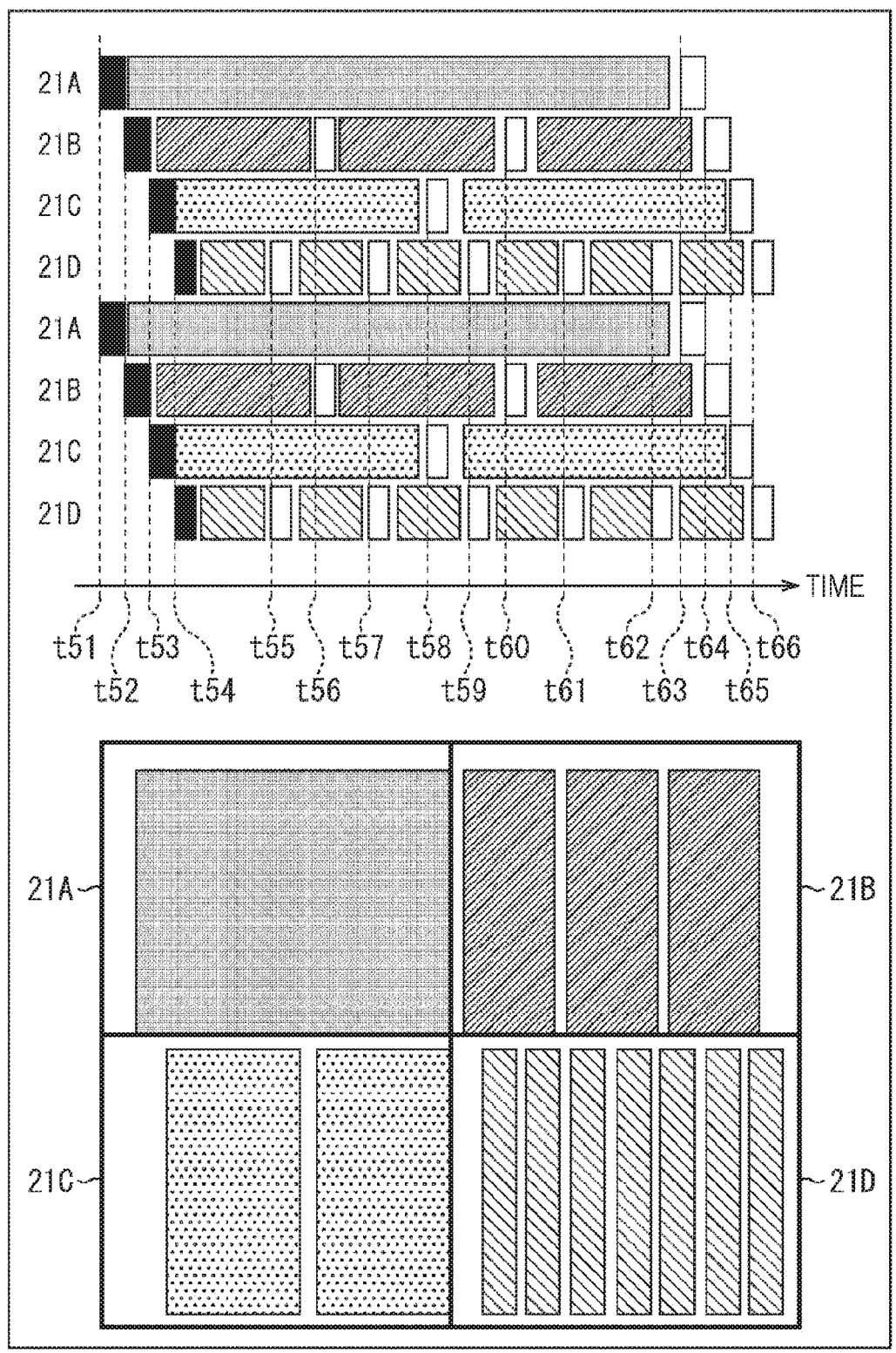
FIG. 10 is a first exposure control example of pixel-shared pixels.

In other words, as illustrated in the upper part of FIG. 10, in the pixel 21A, the exposure is started when the transfer transistor 123 is turned off by the transfer signal TX after the reset processing is performed at time t51, and the exposure is terminated when the transfer transistor 123 is turned on by the transfer signal TX and the reading processing is performed at time t63.

In other words, as illustrated in the lower part in FIG. 10, all the single exposure unit time of the pixel 21A is the exposure period.

Furthermore, as illustrated in the upper part of FIG. 10, in the pixel 21B, the exposure is started when the transfer transistor 123 is turned off by the transfer signal TX after the reset processing is performed at time t52, and the exposure is terminated when the transfer transistor 123 is turned on by the transfer signal TX and the first reading processing is performed at time t56.

Thereafter, the exposure is started as the transfer transistor 123 is turned off by the transfer signal TX, and the exposure is terminated as the transfer transistor 123 is turned on by the transfer signal TX and the second reading processing is performed at time t60.

Moreover, thereafter, the exposure is started as the transfer transistor 123 is turned off by the transfer signal TX, and the exposure is terminated as the transfer transistor 123 is turned on by the transfer signal TX and the third reading processing is performed at time t64.

In other words, as illustrated in the lower part in FIG. 10, in the pixel 21B, exposure of a period obtained by roughly equally dividing one exposure unit time into three periods is repeated three times.

Moreover, as illustrated in the upper part of FIG. 10, in the pixel 21C, the exposure is started when the transfer transistor 123 is turned off by the transfer signal TX after the reset processing is performed at time t53, and the exposure is terminated when the transfer transistor 123 is turned on by the transfer signal TX and the first reading processing is performed at time t58.

Thereafter, the exposure is started as the transfer transistor 123 is turned off by the transfer signal TX, and the exposure is terminated as the transfer transistor 123 is turned on by the transfer signal TX and the second reading processing is performed at time t65.

In other words, as illustrated in the lower part in FIG. 10, in the pixel 21C, exposure of a period obtained by roughly equally dividing one exposure unit time into two periods is repeated twice.

Furthermore, as illustrated in the upper part of FIG. 10, in the pixel 21D, the exposure is started when the transfer transistor 123 is turned off by the transfer signal TX after the reset processing is performed at time t54, and the exposure is terminated when the transfer transistor 123 is turned on by the transfer signal TX and the first reading processing is performed at time t55.

Thereafter, the exposure is started as the transfer transistor 123 is turned off by the transfer signal TX, and the exposure is terminated as the transfer transistor 123 is turned on by the transfer signal TX and the second reading processing is performed at time t57.

Moreover, thereafter, the exposure is started as the transfer transistor 123 is turned off by the transfer signal TX, and the exposure is terminated as the transfer transistor 123 is turned on by the transfer signal TX and the third reading processing is performed at time t59.

Furthermore, thereafter, the exposure is started as the transfer transistor 123 is turned off by the transfer signal TX, and the exposure is terminated as the transfer transistor 123 is turned on by the transfer signal TX and fourth reading processing is performed at time t61.

Moreover, thereafter, the exposure is started as the transfer transistor 123 is turned off by the transfer signal TX, and the exposure is terminated as the transfer transistor 123 is turned on by the transfer signal TX and fifth reading processing is performed at time t62.

Thereafter, the exposure is started as the transfer transistor 123 is turned off by the transfer signal TX, and the exposure is terminated as the transfer transistor 123 is turned on by the transfer signal TX and sixth reading processing is performed at time t66.

In other words, as illustrated in the lower part in FIG. 10, in the pixel 21D, exposure of a period obtained by roughly equally dividing one exposure unit time into six periods is repeated six times.

By the above processing, the exposure times can be realized at equal intervals by the numbers of different times in the pixels 21A to 21D.

(Fourth Exposure Control Example)

In the above description, an example in which the numbers of exposures of the pixels 21A to 21D are set to a plurality of times, and the exposure periods are controlled at equal intervals has been described. However, the numbers of exposures and timings may be made different.

Figure 11:
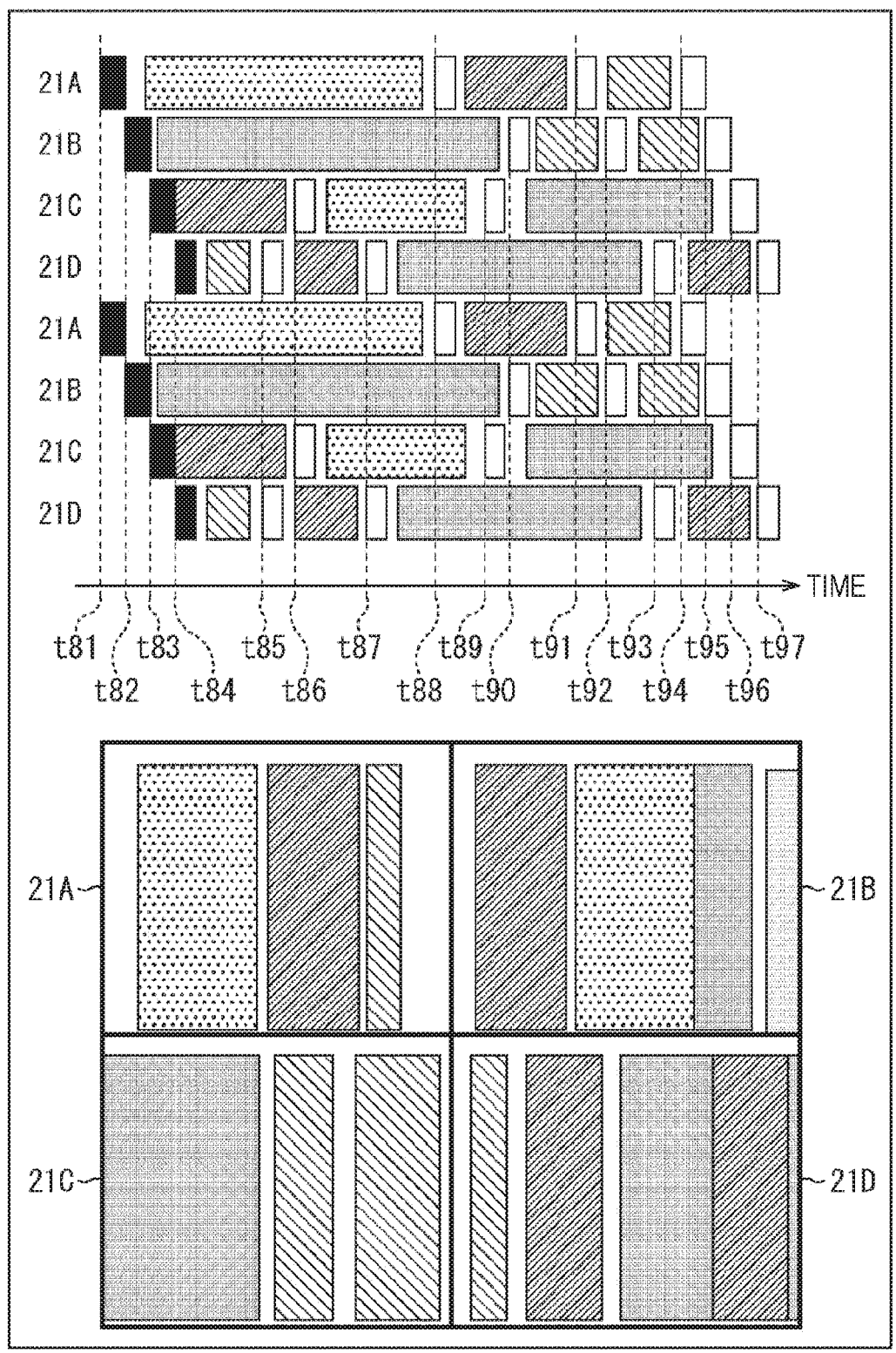
FIG. 11 is a first exposure control example of pixel-shared pixels.

In other words, as illustrated in the upper part of FIG. 11, in the pixel 21A, the exposure is started when the transfer transistor 123 is turned off by the transfer signal TX after the reset processing is performed at time t81, and the exposure is terminated when the transfer transistor 123 is turned on by the transfer signal TX and the first reading processing is performed at time t88.

Thereafter, the exposure is started as the transfer transistor 123 is turned off by the transfer signal TX, and the exposure is terminated as the transfer transistor 123 is turned on by the transfer signal TX and the second reading processing is performed at time t91.

Moreover, thereafter, the exposure is started as the transfer transistor 123 is turned off by the transfer signal TX, and the exposure is terminated as the transfer transistor 123 is turned on by the transfer signal TX and the third reading processing is performed at time t94.

Furthermore, as illustrated in the upper part of FIG. 11, in the pixel 21B, the exposure is started when the transfer transistor 123 is turned off by the transfer signal TX after the reset processing is performed at time t82, and the exposure is terminated when the transfer transistor 123 is turned on by the transfer signal TX and the first reading processing is performed at time t90.

Thereafter, the exposure is started as the transfer transistor 123 is turned off by the transfer signal TX, and the exposure is terminated as the transfer transistor 123 is turned on by the transfer signal TX and the second reading processing is performed at time t92. Moreover, thereafter, at time t95, the third reading processing is performed.

Moreover, as illustrated in the upper part of FIG. 11, in the pixel 21C, the exposure is started when the transfer transistor 123 is turned off by the transfer signal TX after the reset processing is performed at time t83, and the exposure is terminated when the transfer transistor 123 is turned on by the transfer signal TX and the first reading processing is performed at time t86.

Thereafter, the exposure is started as the transfer transistor 123 is turned off by the transfer signal TX, and the exposure is terminated as the transfer transistor 123 is turned on by the transfer signal TX and the second reading processing is performed at time t89.

Moreover, thereafter, the exposure is started as the transfer transistor 123 is turned off by the transfer signal TX, and the exposure is terminated as the transfer transistor 123 is turned on by the transfer signal TX and the third reading processing is performed at time t96.

Furthermore, as illustrated in the upper part of FIG. 11, in the pixel 21D, the exposure is started when the transfer transistor 123 is turned off by the transfer signal TX after the reset processing is performed at time t84, and the exposure is terminated when the transfer transistor 123 is turned on by the transfer signal TX and the first reading processing is performed at time t85.

Thereafter, the exposure is started as the transfer transistor 123 is turned off by the transfer signal TX, and the exposure is terminated as the transfer transistor 123 is turned on by the transfer signal TX and the second reading processing is performed at time t87.

Moreover, thereafter, the exposure is started as the transfer transistor 123 is turned off by the transfer signal TX, and the exposure is terminated as the transfer transistor 123 is turned on by the transfer signal TX and the third reading processing is performed at time t93.

Furthermore, thereafter, the exposure is started as the transfer transistor 123 is turned off by the transfer signal TX, and the exposure is terminated as the transfer transistor 123 is turned on by the transfer signal TX and the fourth reading processing is performed at time t97.

In other words, as illustrated in the lower part in FIG. 11, in the pixels 21A to 21D, the exposure control can be realized by the number of different exposure times, at the different timings, and in the periods having different lengths for one exposure unit time.

To summarize the above exposure control example, the following exposure control can be performed in the solid-state image sensor 1 of the present disclosure. In other words, the exposure control in which the exposure times of at least one or more pixels 21, of a plurality of photoelectric conversion units sharing the ADC 42, are different from the exposure times of the other photoelectric conversion units, and the exposure end times are different. Furthermore, the exposure periods can be switched, and for example, can be changed by <n> powers of 2 for each pixel.

For example, by providing a plurality of exposure ratios and a plurality of the numbers of readouts in one pixel 21, a signal amount for [the exposure ratios] bit x [the numbers of readouts] can be obtained.

Furthermore, by providing and reading the exposure ratios in the plurality of pixels 21A to 21D sharing the ADC 42, a signal amount for [the exposure ratios] bit x [the plurality of pixels] can be obtained.

Moreover, by applying a setting of providing a plurality of exposure ratios and a plurality of the numbers of readouts in predetermined one pixel 21, and providing and reading the exposure ratios in the plurality of pixels 21 sharing the ADC 42, a handling signal amount can be further increased.

More specifically, in a case where the signal amount of the ADC 42 of one basic pixel 21 is 14 bits and a noise amount is 3 bits, for example, the dynamic range is calculated as follows in each state.

In a case where one pixel 21 out of the pixels 21A to 21D has an exposure ratio of 16 times and the number of readouts is 3 times, and similar exposure periods are respectively given to the other three pixels 21, SN=14 bits+4 bits×3 times×1 pixel−3 bits=23 bits=130 dB.

Furthermore, in a case where the four pixels 21 of the pixels 21A to 21D have the exposure ratio of 16 times and different exposure periods, SN=14 bits+4 bits×3 pixels−3 bits=23 bits=130 dB.

Moreover, in a case where the four pixels of the pixels 21A to 21D have the exposure ratio of 16 times and different exposure periods, and the pixel signal is read by own pixel 4 times, SN=14 bits+4 bits×3 pixels+2 bits−3 bits=25 bits=150 dB.

Furthermore, since the pixel signals read in the plurality of times of exposures are AD-converted by the ADC 42 for each pixel, a composite image can be generated by simply performing shift addition of the conversion results, and the increase in memory can be prevented.

The shift addition is to add a pixel signal including a binary code by left-shifting (in other words, multiplication with a power of 2). As a shift amount, a value according to the ratio of the exposure time (exposure ratio) is set.

For example, respective exposure times of the pixels 21A to 21D are Ea, Eb, Ec, and Ed. Values satisfying the following expressions (1) to (3) are set to these exposure times, for example.

$$Ec = 2 \times Ed \quad (1)$$

$$Eb = 2 \times Ec = 4 \times Ed \quad (2)$$

$$Ea = 2 \times Eb = 8 \times Rd \quad (3)$$

Thus, in a case where the ratio of another exposure time to the minimum exposure time (exposure ratio) is set to the powers of 2 (2, 4, and 8), the multiplication can be performed by the shift addition. For example, the pixel signal from the pixel 21B is left-shifted by one bit. Furthermore, the pixel signal from the pixel 21C is left-shifted by two bits, and the pixel signal from the pixel 21D is left-shifted by three bits. Meanwhile, the pixel signal from the pixel 21A is not shifted.

Note that although the exposure ratio is a power of two, the exposure ratio may be set to a value other than a power of two. In a case where the exposure ratio is not a power of 2, it is sufficient that the exposure ratio be multiplied.

As described above, since addition processing can be realized by bit shift, an increase in memory can be prevented.

Note that the signal processing related to the above-described shift addition is based on the premise that all the pixel signals are not saturated, and in a case where the pixel signals are saturated such as a case where a pixel signal level outputs a logic's full scale value or a code corresponding to the full scale value, it is more desirable to include processing of discarding data without performing addition or shifting.

Moreover, the control timing tables are respectively provided for the above-described first to fourth exposure control examples and stored in the control timing table storage unit 24a, and the control timing tables may be switched at predetermined time intervals such as a predetermined number of units of frames or may be switched and used by a switching operation of the operation unit 2 by the user or the like.

<6. Exposure Control Processing>

Figure 12:
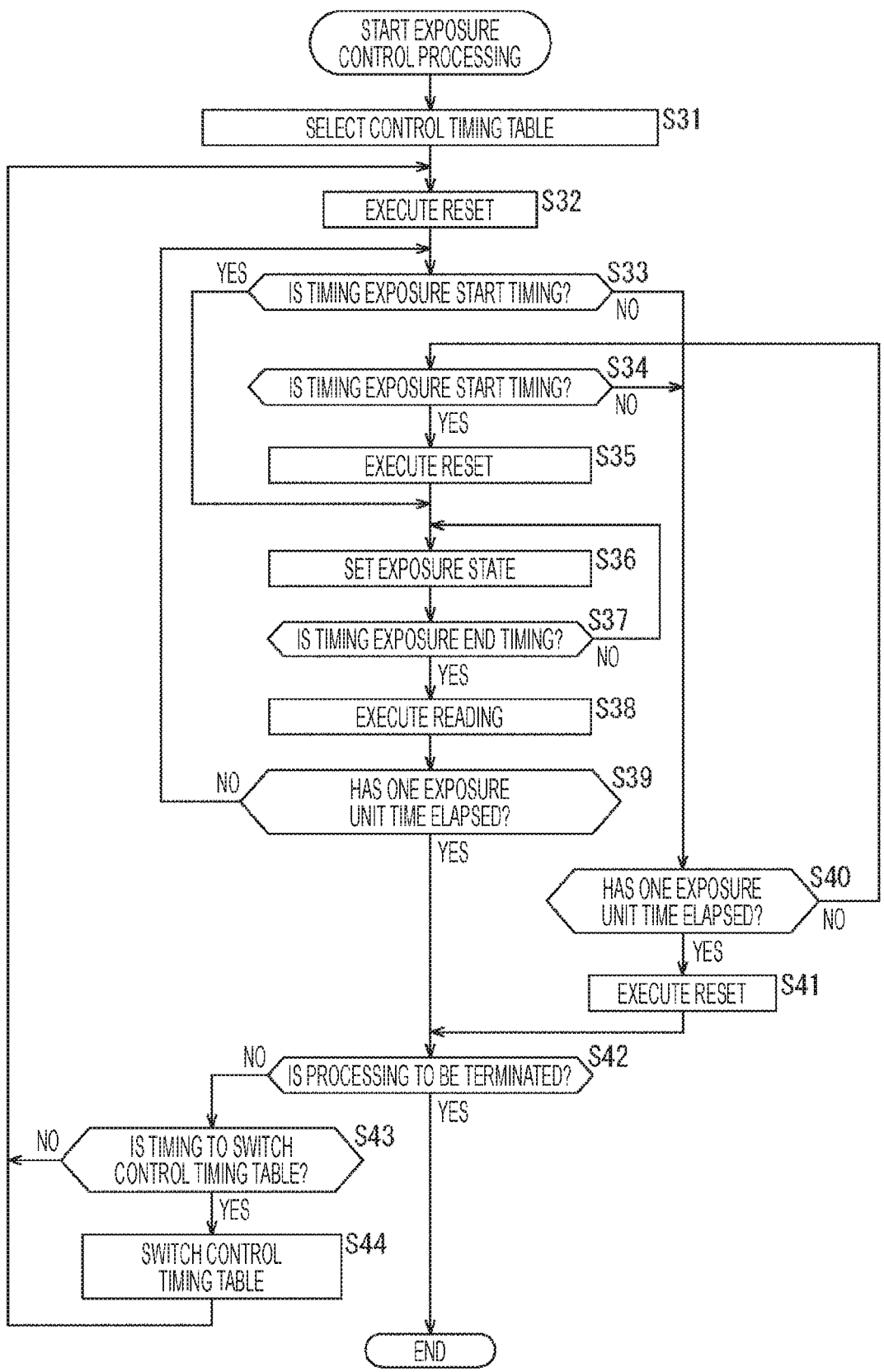
FIG. 12 is a flowchart for describing exposure control processing by the solid-state imaging device in FIG. 1.

Next, exposure control processing by the solid-state imaging device 1 in FIG. 1 will be described with reference to the flowchart in FIG. 12. Note that the exposure control processing to be described with reference to the flowchart in FIG. 12 refers to processing of one pixel 21, and independent processing is executed for each of the four pixels 21.

In step S31, the pixel drive circuit 24 reads a predetermined control timing table from the control timing table storage unit 24a.

In step S32, the pixel drive circuit 24 executes the reset processing for the pixel 21 on the basis of the information of the control timing table.

In step S33, the pixel drive circuit 24 determines whether or not the current timing is the exposure start timing on the basis of the information of the control timing table.

In step S32, in a case where the current timing is the exposure start timing, the processing proceeds to step S36.

In step S36, the pixel drive circuit 24 turns off the transfer transistor 123 by the transfer signal TX to cause the transfer transistor 123 to be in an exposure state.

In step S37, the pixel drive circuit 24 determines whether or not the current timing from the timing generation circuit 29 is the exposure end timing on the basis of the information of the control timing table.

In step S37, in a case where the current timing is not the exposure end timing, the processing returns to step S36. In other words, the processing of steps S36 and S37 is repeated until the exposure end timing arrives, and the exposure state is continued.

In step S37, in a case where the current timing is the exposure end timing, the processing proceeds to step S38.

In step S38, the pixel drive circuit 24 turns on the transfer transistor 123 by the transfer signal TX and executes the reading processing for the pixel 21.

In step S39, the pixel drive circuit 24 determines whether or not the exposure unit time for one time has elapsed on the basis of the information of the control timing table. In a case where the exposure unit time for one time has not elapsed, the processing returns to step S33.

Furthermore, in step S39, in a case where the exposure unit time for one time is regarded to have elapsed, the processing proceeds to step S42.

Meanwhile, in step S33, in a case where the current timing is regarded not to be the exposure start timing, the processing proceeds to step S40.

In step S40, the pixel drive circuit 24 determines whether or not the exposure unit time for one time has elapsed on the basis of the information of the control timing table. In a case where the exposure unit time for one time has not elapsed, the processing proceeds to step S34.

In step S34, the pixel drive circuit 24 determines whether or not the current timing is the exposure start timing on the basis of the information of the control timing table.

In step S34, in a case where the current timing is not the exposure start timing, the processing returns to step S40.

In other words, in a case where the start of the exposure is given in instruction immediately after the first reset of the exposure unit time for one time that is the processing in step S32, the processing proceeds to step S36 and the exposure is immediately started.

However, in a case where the start of the exposure is not given in instruction immediately after the first reset, as illustrated in the times t2 and t3 in FIG. 8, for example, the processing proceeds to step S34 or S40 and the processing in step S34 or S40 is repeated until the exposure unit time for one time elapses.

Then, in a case where the current timing is regarded to be the exposure start timing in step S34 before the exposure unit time for one time elapses, the processing proceeds to step S35.

In step S35, the pixel drive circuit 24 executes the reset processing for the pixel 21 on the basis of the information of the control timing table, and the processing proceeds to step S36.

In other words, even in a case where the start of the exposure is not given in instruction immediately after the first reset, and thereafter, the timing has become the exposure start timing, as illustrated in times t6 and t7 in FIG. 8, for example, reset is performed again and the exposure is started.

Furthermore, in step S40, in the case where the exposure unit time for one time is regarded to have elapsed, the processing proceeds to step S41.

In step S41, the pixel drive circuit 24 executes the reset processing for the pixel 21 on the basis of the information of the control timing table, and the processing proceeds to step S42.

In other words, the processing of steps S33 to S40 is repeated until the exposure unit time for one time elapses.

Then, in a case where the exposure unit time for one time has elapsed, or in a case where the exposure unit time for one time has elapsed and the reset processing is performed in step S41, the processing proceeds to step S42.

In step S42, the pixel drive circuit 24 determines whether or not the processing is to be terminated, and in a case where the processing is not terminated, the processing proceeds to step S43.

In step S43, the pixel drive circuit 24 determines whether or not the current timing is timing to switch the control timing table. For example, in a case where the operation unit 2 is operated and the operation signal for switching the control timing table to a predetermined control timing table is supplied, or in a case where use of another predetermined control timing table after elapse of a predetermined time is given in instruction in information described in the previously used control timing table, the pixel drive circuit 24 determines to switch the control timing table, and the processing proceeds to step S44.

In step S44, the pixel drive circuit 24 reads the control timing table to be switched among the control timing tables stored in the control timing table storage unit 24a, and the processing returns to step S32 and the processing thereafter is repeated.

On the other hand, in step S43, in a case where the current timing is determined not to be the timing to switch the control timing table, processing in step S44 is skipped. In this case, the control timing table currently being read continues to be used as it is.

In step S42, in a case where termination of the processing is given in instruction, the processing is terminated.

By the processing, the above-described pixels 21A to 21D can be individually controlled. Therefore, a wide dynamic range can be realized in all of regions. Furthermore, the time sharing of the exposure period and the occurrence of the unexposed period can be prevented, and the object that emits light with high illuminance for a short time can be reliably captured.

As a result, the dynamic range can be appropriately expanded with respect to an object moving at a high speed or an object having a large luminance difference between bright and dark. Furthermore, motion distortion (motion artifact) can be reduced.

Furthermore, since the exposure signals in the plurality of times of short periods are AD-converted by the ADC 42 for each pixel, a composite image can be generated by simply performing shift addition of the conversion results, and the increase in memory can be prevented.

Figure 6:
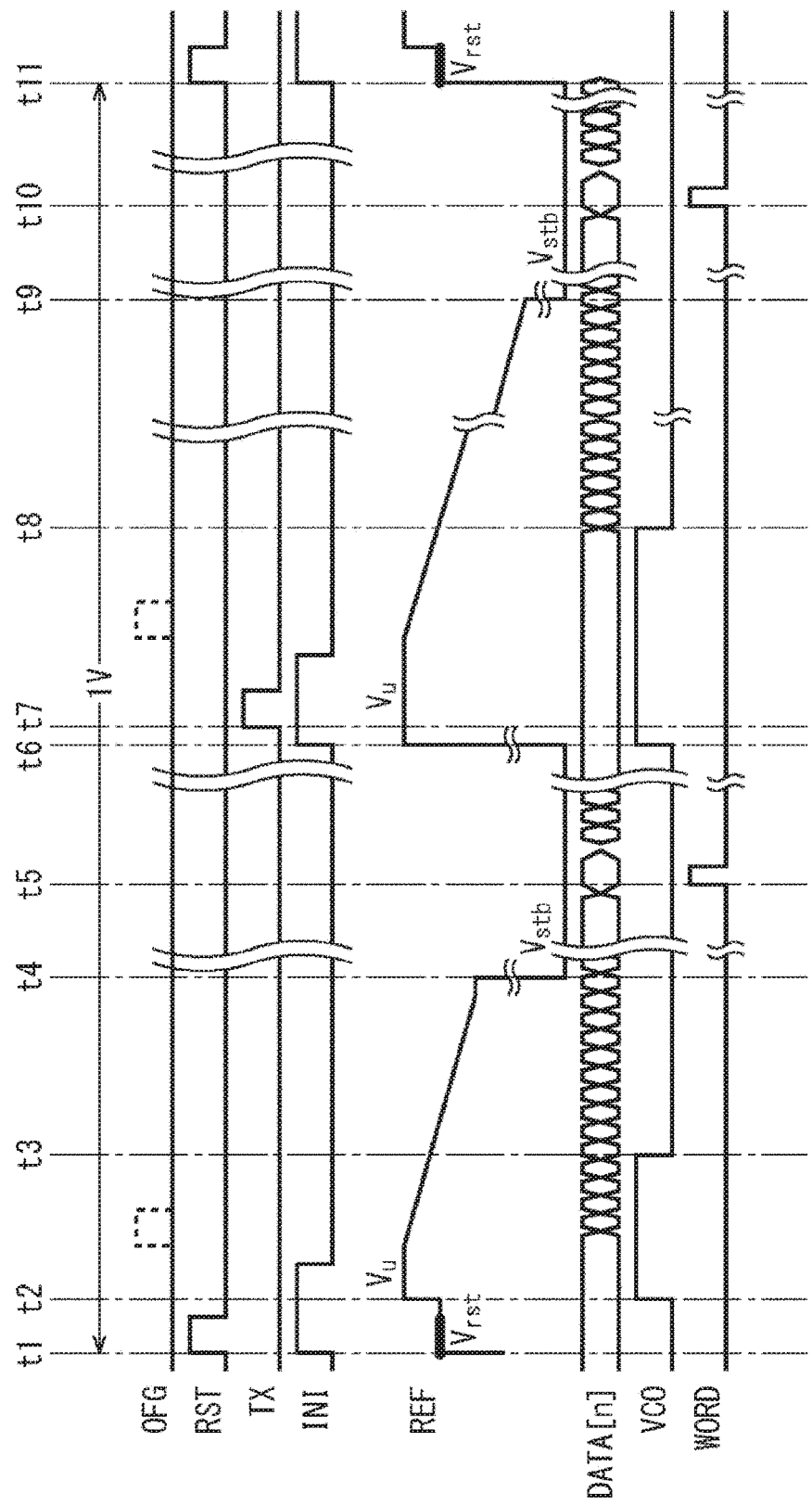
FIG. 6 is a timing chart illustrating an operation of a pixel.

The above description has been given by way of an example of the reset processing and the reading processing based on the description of the operation using the timing chart in FIG. 6. However, a similar operation may be realized using the discharge transistor 122. By using the discharge transistor 122, the degree of freedom in the exposure control can be increased.

Furthermore, the ADC 42 has been described as an example provided in the pixel 21. However, the ADC 42 may be provided outside a pixel or a configuration other than the ADC 42 may be adopted as long as the configuration is capable of performing AD conversion.

<7. Application Examples to Electronic Devices>

The above-described solid-state imaging device 1 can be applied to various electronic devices such as imaging devices such as a digital still camera and a digital video camera, a mobile telephone device having an imaging function, and another device having the imaging function.

Figure 13:
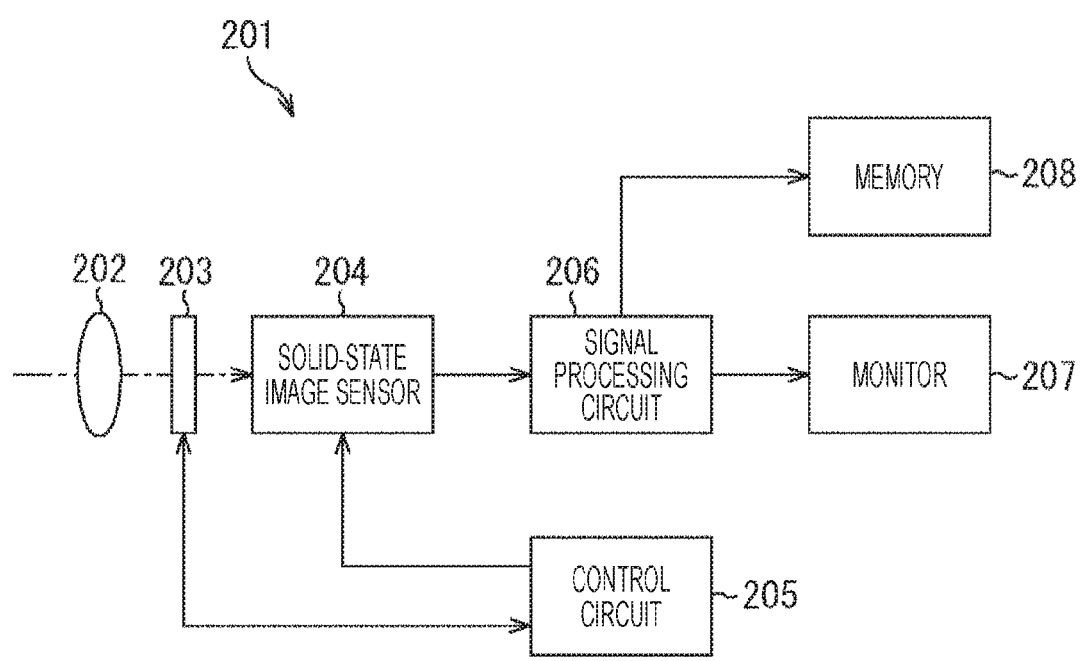
FIG. 13 is a block diagram illustrating a configuration example of an imaging device as an electronic device to which a solid-state imaging device of the present disclosure is applied.

FIG. 13 is a block diagram illustrating a configuration example of an imaging device as an electronic device to which the present technology is applied.

An imaging device 201 illustrated in FIG. 13 includes an optical system 202, a shutter device 203, a solid-state image sensor 204, a drive circuit 205, a signal processing circuit 206, a monitor 207, and a memory 208, and can image a still image and a moving image.

The optical system 202 includes one or a plurality of lenses, and guides light (incident light) from a subject to the solid-state image sensor 204 to form an image on a light-receiving surface of the solid-state image sensor 204.

The shutter device 203 is arranged between the optical system 202 and the solid-state image sensor 204, and controls a light irradiation period and a light shielding period for the solid-state image sensor 204 according to control of the drive circuit 205.

The solid-state image sensor 204 is configured from a package including the above-described solid-state image sensor. The solid-state image sensor 204 accumulates signal charges for a fixed period according to the light formed on the light-receiving surface through the optical system 202 and the shutter device 203. The signal charges accumulated in the solid-state image sensor 204 are transferred according to a drive signal (timing signal) supplied from the drive circuit 205.

The drive circuit 205 outputs a transfer operation of the solid-state image sensor 204 and a drive signal for controlling a shutter operation of the shutter device 203 to drive the solid-state image sensor 204 and the shutter device 203.

The signal processing circuit 206 applies various types of signal processing to the signal charges output from the solid-state image sensor 204. An image (image data) obtained by application of the signal processing by the signal processing circuit 206 is supplied to and displayed on the monitor 207 and is supplied to and stored (recorded) in the memory 208.

By applying the solid-state imaging device 1 instead of the solid-state image sensor 204 in the imaging device 201 thus configured, the dynamic range can be appropriately expanded with respect to an object moving at a high speed or an object having a large luminance difference between bright and dark to reduce motion distortion (motion artifact).

<8. Use Example of Solid-State Imaging Device>

Figure 14:
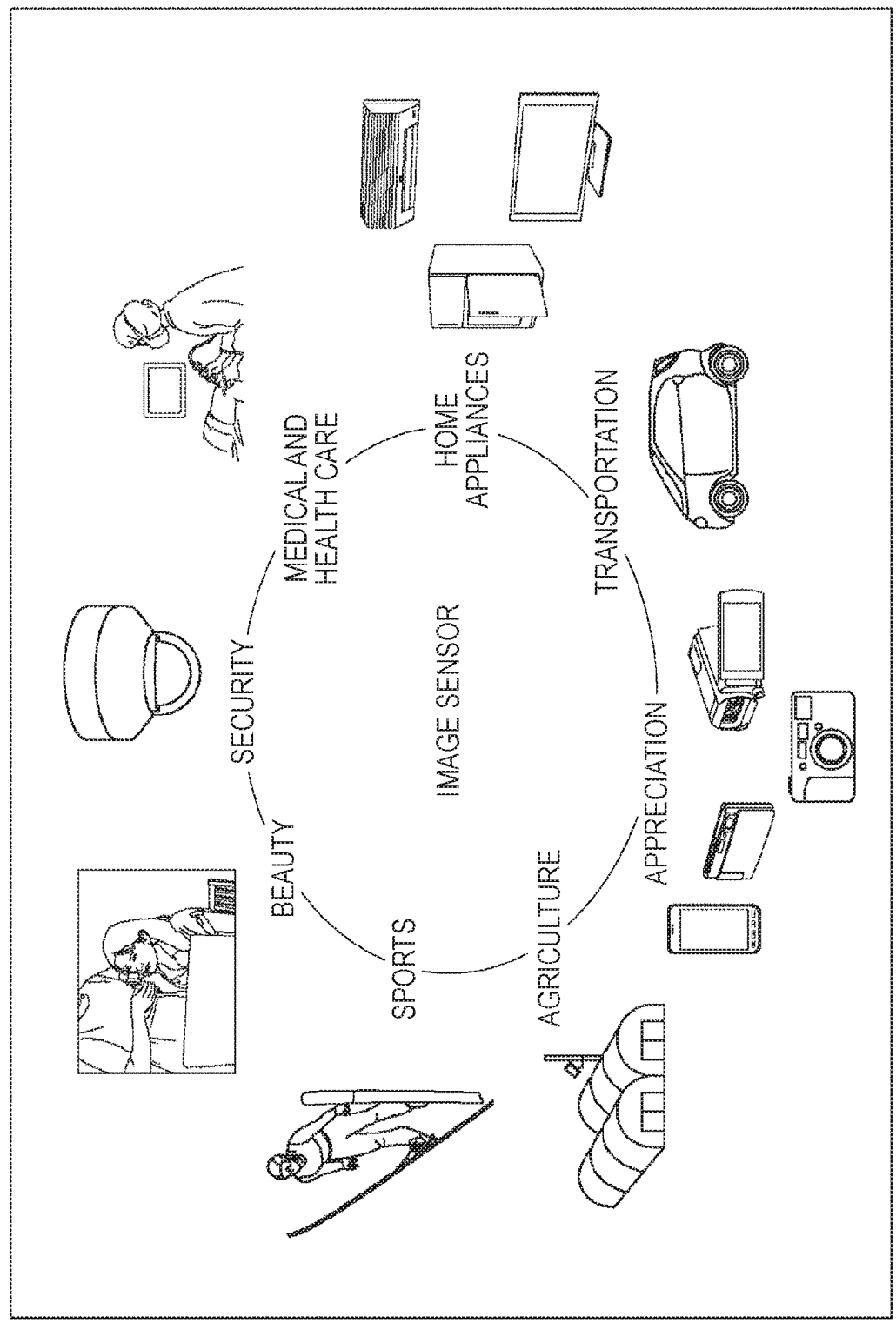
FIG. 14 is a diagram illustrating a use example of a solid-state imaging device to which the technology of the present disclosure is applied.

FIG. 14 is a diagram illustrating a use example of the above-described solid-state imaging device 1.

The above-described camera module can be used, for example, in various cases of sensing light such as visible light, infrared light, ultraviolet light, and an X-rays, as described below.

Devices that capture an image provided for appreciation use, such as a digital camera or a mobile device with a camera function.

Devices provided for transportation, such as in-vehicle sensors that capture the front, rear, peripheries, an interior of the vehicle, etc. for safe driving such as automatic stop, recognition of a state of a driver, or the like, monitoring cameras that monitor traveling vehicles and roads, distance measuring sensors that measure a distance between vehicles, and the like Devices provided for home appliances such as TVs, refrigerators, and air conditioners to capture gestures of users and perform device operations according to the gestures Devices provided for medical and healthcare, such as endoscopes, devices that perform angiography by receiving infrared light Devices provided for security, such as monitoring cameras for crime prevention and cameras for person authentication use Devices for beauty, such as skin measuring instruments that capture skin and microscopes that capture scalp Devices provided for sports or the like, such as action cameras and wearable cameras for sport use Devices provided for agriculture, such as cameras for monitoring the condition of fields and crops Note that the present disclosure can have the following configurations.

<1> A solid-state imaging device including:
a pixel array unit including a plurality of pixels; and
a pixel drive control unit configured to individually control exposure of at least a part of the plurality of pixels in units of pixels.

<2> The solid-state imaging device according to <1>, in which
the pixel drive control unit individually controls an exposure start timing and an exposure end timing in the exposure of the plurality of pixels in units of pixels.

<3> The solid-state imaging device according to <2>, in which
the pixel drive control unit individually controls a reset timing, a read timing, the exposure start timing, and the exposure end timing in the exposure of the plurality of pixels in units of pixels.

<4> The solid-state imaging device according to <3>, in which
the pixel drive control unit individually controls the number of exposure periods of an exposure unit time in the exposure of the plurality of pixels in units of pixels.

<5> The solid-state imaging device according to <4>, in which,
when individually controlling the number of the exposure periods of the exposure unit time in the exposure of the plurality of pixels in units of pixels, the pixel drive control unit controls the exposure period at temporally equal intervals in the exposure unit time.

<6> solid-state imaging device according to <4>, in which, in a case where the exposure period in the exposure of the plurality of pixels is a plurality of times, an analog-to-digital converted pixel signal output from the pixel is shift-added to an immediately preceding pixel signal every time the exposure is completed.

<7> The solid-state imaging device according to <2>, in which
the pixel drive control unit controls the exposure start timing and the exposure end timing in the exposure of the plurality of pixels in a predetermined number of units of pixels.

<8> The solid-state imaging device according to any one of <1> to <7>, in which
the pixel drive control unit
includes a control timing table storage unit that stores a plurality of control timing tables, each table including control information for individually controlling the exposure of the plurality of pixels in units of pixels, and
individually controls the exposure of the plurality of pixels in units of pixels on the basis of the control information of the control timing table.

<9> The solid-state imaging device according to <8>, in which
the pixel drive control unit
switches the control timing table stored in the control timing table storage unit at predetermined time intervals.

<10> The solid-state imaging device according to <9>, in which
the pixel drive control unit
switches the control timing table stored in the control timing table storage unit every predetermined number of frames.

<11> The solid-state imaging device according to <9>, further including:
an operation unit configured to receive an operation of a user and output an received operation signal, in which
the pixel drive control unit
switches the control timing table stored in the control timing table storage unit according to the operation signal from the operation unit.

<12> A method of controlling a solid-state imaging device, the method including:
individually controlling, in units of pixels, exposure of at least a part of a plurality of pixels of a pixel array unit including the plurality of pixels.

<13> An electronic device including:
a pixel array unit including a plurality of pixels; and
a pixel drive control unit configured to individually control exposure of at least a part of the plurality of pixels in units of pixels.

REFERENCE SIGNS LIST

1 Solid-state imaging device
21 Pixel
22 Pixel array unit
23 Time code transfer unit
24 Pixel drive circuit
24a Control timing table
26 Time code generation unit
28 Output unit
41 Pixel circuit
42 ADC
51 Comparison circuit
52 Data storage unit
61 Differential input circuit
62 Voltage conversion circuit
63 Positive feedback circuit
71 Latch control circuit
72 Latch storage unit
81 to 87 and 91 Transistor
101 to 105 and 111 to 113 Transistor

The invention claimed is:
1. A solid-state imaging device, comprising:
a pixel array unit including a plurality of pixels; and
a pixel drive control unit including a control timing table storage unit configured to store a plurality of control timing tables, wherein
each control timing table of the plurality of control timing tables includes control information for individual control of an exposure of the plurality of pixels in units of pixels, and the pixel drive control unit is configured to:
    individually control the exposure of the plurality of pixels in units of pixels based on the control information of a control timing table of the plurality of control timing tables; and
    switch the control timing table of the plurality of control timing tables stored in the control timing table storage unit at specific time intervals.

2. The solid-state imaging device according to claim 1, wherein
    the pixel drive control unit is further configured to individually control an exposure start timing and an exposure end timing in the exposure of the plurality of pixels in units of pixels.

3. The solid-state imaging device according to claim 2, wherein
    the pixel drive control unit is further configured to individually control a reset timing, a read timing, the exposure start timing, and the exposure end timing in the exposure of the plurality of pixels in units of pixels.

4. The solid-state imaging device according to claim 3, wherein
    the pixel drive control unit is further configured to individually control a plurality of exposure periods of an exposure unit time in the exposure of the plurality of pixels in units of pixels.

5. The solid-state imaging device according to claim 4, wherein
    the pixel drive control unit is further configured to control each exposure period of the plurality of exposure periods with temporally equal intervals in the exposure unit time based on the individual control of the plurality of exposure periods.

6. The solid-state imaging device according to claim 4, wherein, based on the exposure unit time that includes the plurality of exposure periods in the exposure of each pixel of the plurality of pixels, an analog-to-digital converted pixel signal output from a pixel of the plurality of pixels is shift-added to an immediately preceding pixel signal each time the exposure is completed.

7. The solid-state imaging device according to claim 2, wherein
    the pixel drive control unit is further configured to control the exposure start timing and the exposure end timing in the exposure of the plurality of pixels in a specific number of units of pixels.

8. The solid-state imaging device according to claim 1, wherein
    the pixel drive control unit is further configured to switch the control timing table stored in the control timing table storage unit at specific number of frames.

9. The solid-state imaging device according to claim 1, further comprising
    an operation unit configured to receive an operation of a user and output an operation signal, wherein
    the pixel drive control unit is further configured to switch the control timing table stored in the control timing table storage unit based on the operation signal from the operation unit.

10. A method of controlling a solid-state imaging device, the method comprising:
    individually controlling, in units of pixels, an exposure of a plurality of pixels of a pixel array unit based on control information of a control timing table of a plurality of control timing tables, wherein
    the control information is information for individual control of the exposure of the plurality of pixels in units of pixels, and
    the plurality of control timing tables is stored in a control timing table storage unit; and
    switching the control timing table of the plurality of control timing tables stored in the control timing table storage unit at specific time intervals.

11. An electronic device, comprising:
    a pixel array unit including a plurality of pixels; and
    a pixel drive control unit including a control timing table storage unit configured to store a plurality of control timing tables, wherein
    each control timing table of the plurality of control timing tables includes control information for individual control of an exposure of the plurality of pixels in units of pixels, and
    the pixel drive control unit is configured to:
        individually control the exposure of the plurality of pixels in units of pixels based on the control information of a control timing table of the plurality of control timing tables; and
        switch the control timing table of the plurality of control timing tables stored in the control timing table storage unit at specific time intervals.

* * * * *